(12) United States Patent  (10) Patent No.: US 7,707,373 B2
Murayama et al.  (45) Date of Patent: Apr. 27, 2010

(54) STORAGE SYSTEM AND BACKUP METHOD

(75) Inventors: Tomonori Murayama, Yokohama (JP); Yoichi Mizuno, Yokohama (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 590 days.

(21) Appl. No.: 11/599,560

(22) Filed: Nov. 13, 2006

(65) Prior Publication Data

US 2008/0059736 A1   Mar. 6, 2008

(30) Foreign Application Priority Data

Sep. 1, 2006   (JP)   ............... 2006-237671

(51) Int. Cl.
  G06F 12/00 (2006.01)
  G06F 13/00 (2006.01)
  G06F 13/28 (2006.01)
  G06F 11/00 (2006.01)

(52) U.S. Cl. .................. 711/162; 711/154; 711/161; 711/166; 714/5; 714/6

(58) Field of Classification Search .............. 711/162
See application file for complete search history.

(56) References Cited

U.S. PATENT DOCUMENTS 5,720,026 A   2/1998  Uemura et al.
5,835,953 A * 11/1998  Ohran ........................ 711/162
7,464,235 B2 * 12/2008  Uratani et al. ............. 711/162
2005/0033911 A1 * 2/2005  Kitamura et al. .......... 711/111

FOREIGN PATENT DOCUMENTS

JP   784728 A    3/1995
JP   9-101912 A   4/1997
JP   11-212875    8/1999
JP   200518509 A   1/2005

OTHER PUBLICATIONS

Japanese Office Action dated Nov. 25, 2008.
Japanese Patent Office Search Report, Jun. 30, 2009.

* cited by examiner

*Primary Examiner*—Christian P Chace
*Assistant Examiner*—Ryan Bertram
(74) *Attorney, Agent, or Firm*—Sughrue Mion, PLLC

(57) ABSTRACT

Differential management information that is information representing the difference between a logical volume and a sequential device group after a full backup is updated in response to an update of the logical volume. Partial data that are data representing the difference between the logical volume and sequential device group are specified by using the updated differential management information, information necessary for restoration that is necessary to restore the data group located in the updated logical volume by using the partial data is recorded in the sequential device group, and the partial data are backed up from the updated logical volume into the sequential device group.

17 Claims, 20 Drawing Sheets

FIG. 3

MANAGEMENT OF VOLUME PAIR — 215

PAIR CONFIGURATION MANAGEMENT TABLE — 301

| VOLUME PAIR NUMBER (311) | PRIMARY VOLUME (312) | SECONDARY VOLUME (313) | STATUS (314) |
|---|---|---|---|
| 1 | 1001 | 2001 | PAIR STATUS |
| 2 | 1002 | 2002 | SPLIT STATUS |
| 3 | 1003 | 2003 | TRANSITION TO PAIR STATUS |
| 4 | 1004 | 2004 | TRANSITION TO SPLIT STATUS |
| 5 | 1005 | 2005 | ERROR STATUS |
| ⋮ | ⋮ | ⋮ | ⋮ |

VOLUME PAIR DIFFERENTIAL MANAGEMENT TABLE — 302

| VOLUME PAIR NUMBER (321) | DIFFERENTIAL BITMAP NUMBER (322) | DIFFERENTIAL MANAGEMENT SIZE (323) | DIFFERENTIAL BITMAP STORAGE LOCATION (324) |
|---|---|---|---|
| 1 | 1 | 1MB | 0:0-0:1000 |
| 2 | 2 | 1MB | 1:2000-1:4000 |
| 3 | 3 | 2MB | 1:5000-1:6000 |
| ⋮ | ⋮ | ⋮ | ⋮ |

VOLUME PAIR DIFFERENTIAL MANAGEMENT BITMAP — 303

331a 331b 331c 331d 331e

| 1001 | 1002 | 1003 | 1004 | 1005 | ... | | | |
|---|---|---|---|---|---|---|---|---|
| 2001 | ... | | | | | | | |
| ... | | | | | | | | |
| | | | | | | | | |
| | | | | | | | | |
| | | | | | | | | |

FIG. 5
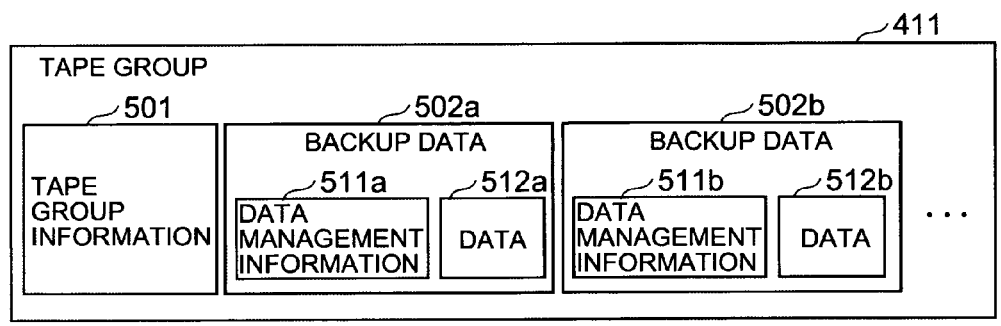
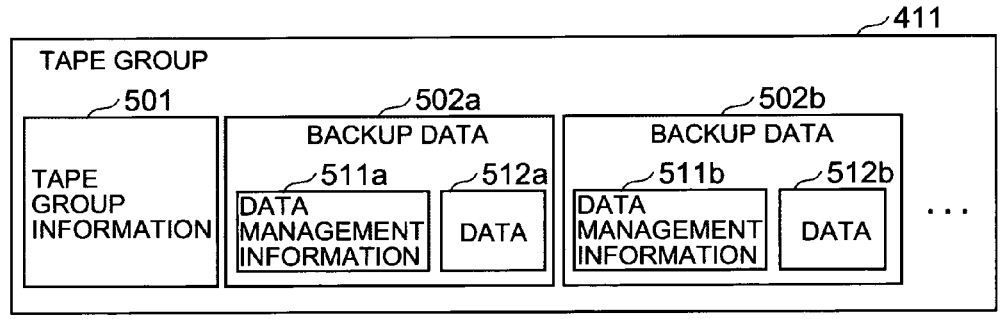

FIG. 6

TAPE MANAGEMENT

TAPE POOL MANAGEMENT TABLE (601)

| TAPE POOL NUMBER (611) | NUMBERS OF TAPES CONSTITUTING TAPE POOL (612) | STORAGE TAPE GROUP NUMBER (613) |
|---|---|---|
| 1 | 101,102,103 | 11,12,13 |
| 2 | 111-131 | 14,15 |
| ⋮ | ⋮ | ⋮ |

TAPE GROUP MANAGEMENT TABLE (602)

| TAPE GROUP NUMBER (621) | TAPE GROUP STATUS (622) | TAPE GROUP CONFIGURATION TAPE (623) | BACKUP SOURCE LUN (624) | BACKUP DATA CLASS (625) | NUMBER OF TAPE GROUP NECESSARY FOR RESTORATION (626) | NUMBER OF TAPE POOL TO WHICH THE TAPE BELONGS (627) | RECORDING DATE AND TIME (628) |
|---|---|---|---|---|---|---|---|
| 11 | NORMAL | 101:10-900<br>102:0-900<br>103:0-900 | 2001,2002 | FULL | | 1 | 2006/4/4 22:00:00 |
| 12 | NORMAL | 104:50-900<br>105:0-500 | 2001,2002 | DIFFERENTIAL | 11 | 1 | 2006/4/11 22:00:00 |
| 13 | NORMAL | 106:0-300 | 2001,2002 | INCREMENTAL | 11,12 | 1 | 2006/4/12 22:00:00 |
| 14 | BACKUP IS CONDUCTED | 107:0-900 | 2003 | FULL | | 2 | 2006/4/20 20:10:00 |
| ⋮ | ⋮ | ⋮ | ⋮ | ⋮ | ⋮ | ⋮ | ⋮ |

TAPE MEDIA MANAGEMENT TABLE (603)

| TAPE NUMBER (631) | TAPE CLASS (632) | ONE BLOCK SIZE (633) | TAPE CAPACITY (634) | USED CAPACITY (635) | TAPE STATUS (636) | NUMBER OF TAPE POOL TO WHICH THE TAPE BELONGS (637) | NUMBER OF TAPE GROUP TO WHICH THE TAPE BELONGS (638) |
|---|---|---|---|---|---|---|---|
| 101 | LT03 | 512B | 400GB | 300GB | NORMAL | 1 | 11 |
| 111 | LT03 | 512B | 400GB | 0GB | NOT USED | 4 | |
| 121 | LT04 | 256B | 800GB | 0GB | ERROR | | |
| ⋮ | ⋮ | ⋮ | ⋮ | ⋮ | ⋮ | | |

FIG. 7

211 BACKUP DATA MANAGEMENT

701 BACKUP DATA MANAGEMENT TABLE

| 711 BACKUP DATA NUMBER | 712 BACKUP SOURCE LUN | 713 BACKUP DESTINATION TAPE GROUP NUMBER | 714 STATUS OF BACKUP DATA | 715 BACKUP DATA CLASS | 716 BACKUP ACQUISITION DATE AND TIME |
|---|---|---|---|---|---|
| 1 | 2001,2002 | 11 | NORMAL | FULL | 2006/4/4 22:00:00 |
| 2 | 2001,2002 | 12 | NORMAL | DIFFERENTIAL | 2006/4/11 22:00:00 |
| 3 | 2001,2002 | 13 | NORMAL | INCREMENTAL | 2006/4/12 22:00:00 |
| 4 | 2003 | 14 | ERROR | FULL | 2006/4/20 20:10:00 |
| ⋮ | ⋮ | ⋮ | ⋮ | ⋮ | ⋮ |

702 DATA DIFFERENTIAL MANAGEMENT TABLE

| 721 LUN | 722 DIFFERENTIAL BITMAP NUMBER | 723 BACKUP CLASS | 724 DIFFERENTIAL MANAGEMENT SIZE | 725 DIFFERENTIAL BITMAP STORAGE POSITION |
|---|---|---|---|---|
| 2001 | 1 | DIFFERENTIAL | 1MB | 5:0-5:1000 |
| 2001 | 2 | INCREMENTAL | 1MB | 5:2000-5:4000 |
| 2002 | 3 | DIFFERENTIAL | 2MB | 7:5000-7:6000 |
| 2002 | 4 | INCREMENTAL | 2MB | 8:2000-8:4000 |
| ⋮ | ⋮ | ⋮ | ⋮ | ⋮ |

703 DATA DIFFERENTIAL MANAGEMENT BITMAP

| 731a | 731b | 731c | 731d | 731e | | | | |
|---|---|---|---|---|---|---|---|---|
| 1001 | 1002 | 1003 | 1004 | 1005 | ··· | | | |
| 2001 | ··· | | | | | | | |
| ··· | | | | | | | | |
| | | | | | | | | |
| | | | | | | | | |
| | | | | | | | | |

TO FIG. 17

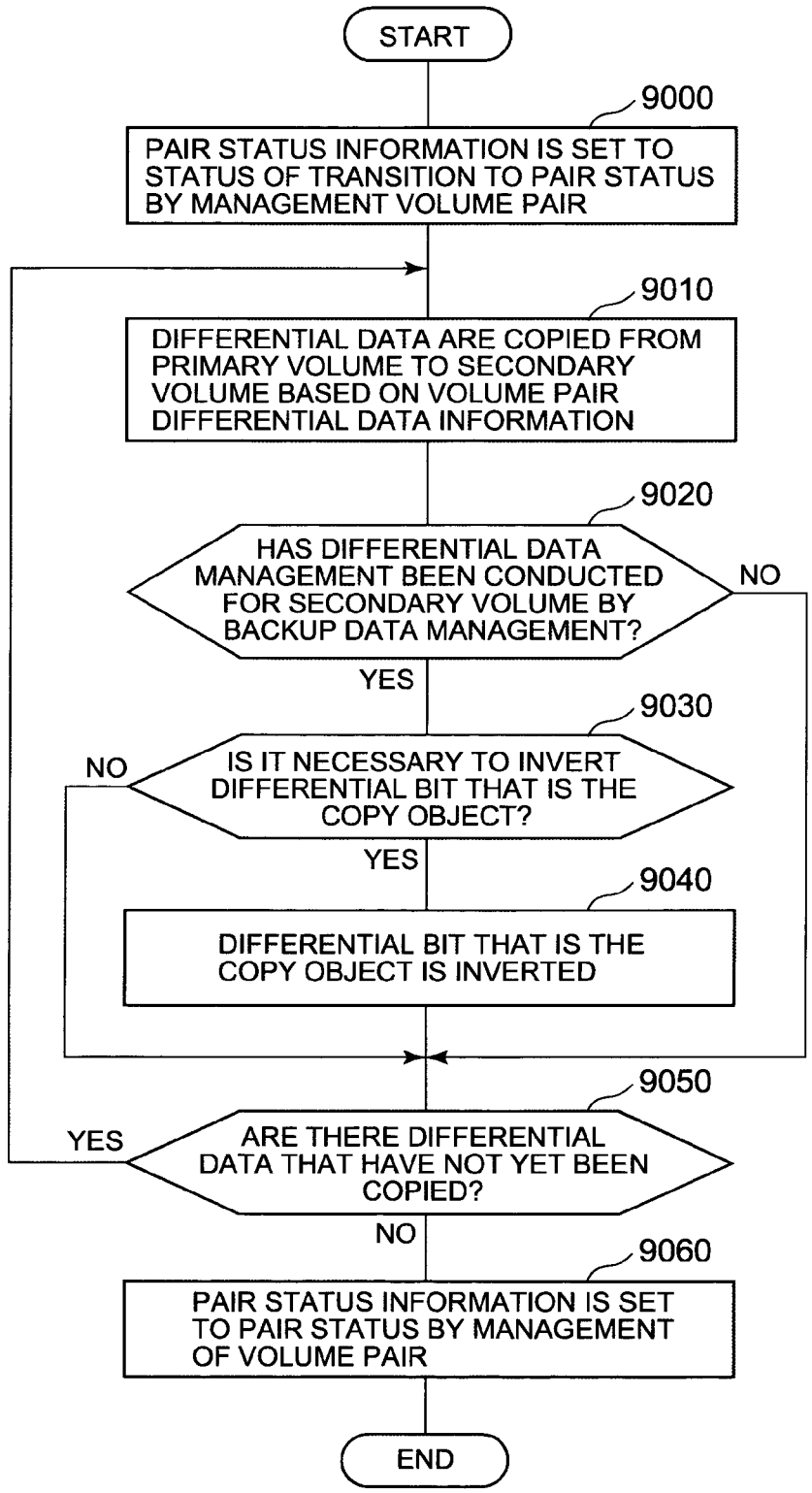

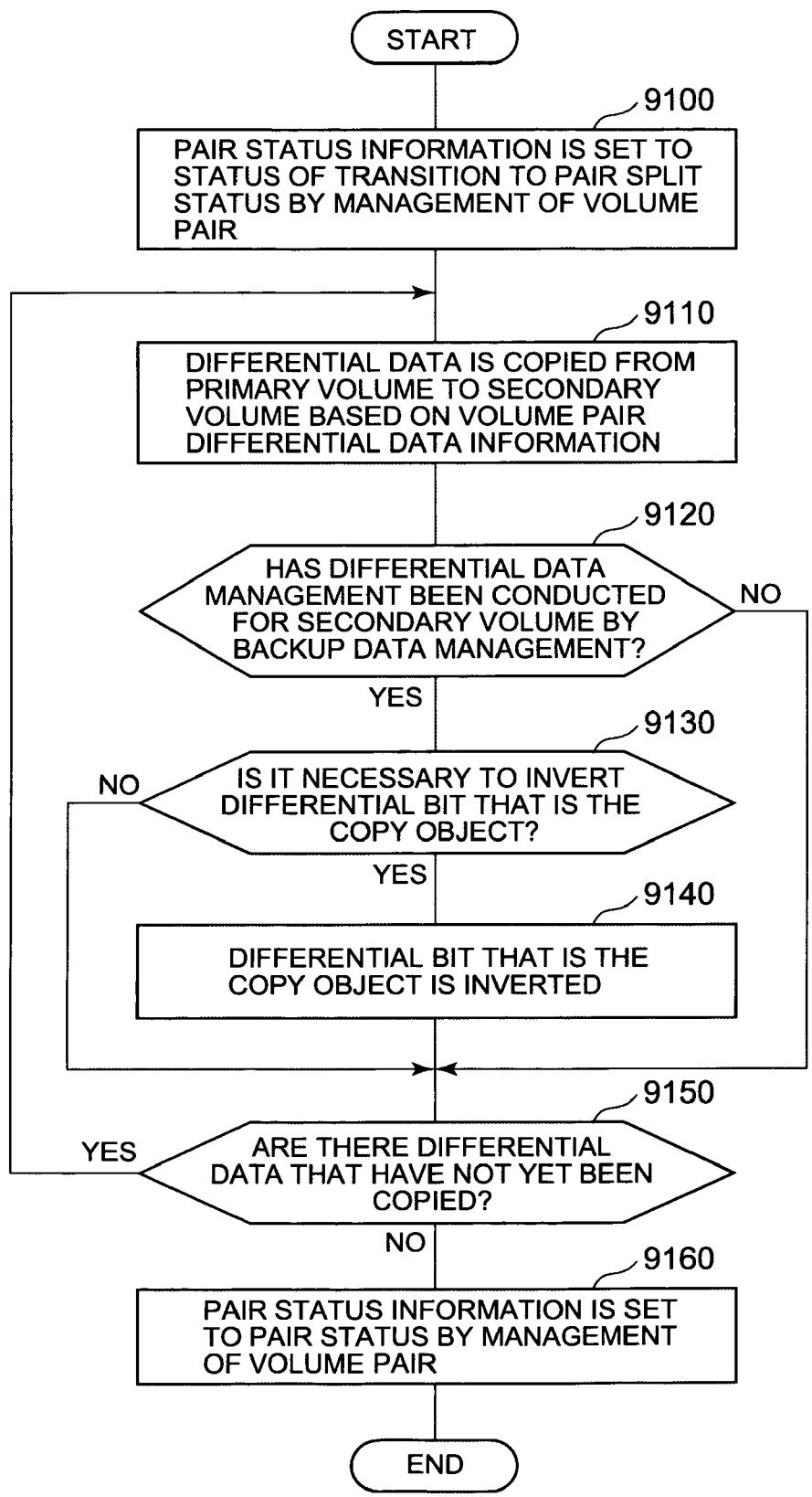

STORAGE SYSTEM AND BACKUP METHOD

CROSS-REFERENCE TO PRIOR APPLICATION

This application relates to and claims the benefit of priority from Japanese Patent Application No. 2006-237671, filed on Sep. 1, 2006 the entire disclosure of which is incorporated herein by reference.

BACKGROUND

The present invention generally relates to data backup technology.

For example, Japanese Patent Application Laid-open No. H11-212875 discloses a method by which in a storage subsystem including a primary subsystem and a secondary subsystem, the primary subsystem performs full backup and differential backup of data received from a higher-level device in the secondary subsystem. Furthermore, a method for performing data restoration from the data backed up in the secondary subsystem is also disclosed.

For example, there exist methods by which a computer, a disk storage, and a tape library device are connected to a communication network termed SAN (Storage Area Network) and data stored in the disk storage are backed up to the tape library device by a server for processing of backup (referred to hereinbelow as "backup server"). In this case, the data that are the backup object are backed up via the backup server. The resultant problem is that the backup performance depends on the backup server, and when the processing performance of the backup server is low, the time required for the backup is increased.

A similar problem is also encountered, for example, when the backed-up data are restored in the processing flow that is inverted with respect to the backup, more specifically, when data are restored from the tape library device to the disk storage via the backup server.

Those problems can be resolved by the backup method disclosed in Japanese Patent Application Laid-open No. H11-212875. However, with this backup method, in the case of differential backup, data are recorded on a tape, and the information necessary to restore the data, for example, information for managing the difference between the data (referred to hereinbelow as "differential data information") is stored in the control memory of the secondary subsystem. For this reason, the processing of data restore is performed by using both the data recorded on the tape and the differential data information stored in the control memory of the secondary subsystem. The resultant problem is that, for example, when the information of the control memory of the secondary subsystem is lost due to an accident or the like, the differentially back-up data cannot be restored.

Yet another problem is that in order to perform differential backup of multiple generations to store the differential data information in the control memory of the secondary subsystem, the control memory has to have a storage capacity enabling the memory to store the differential data information of each generation, and the number of generations for which the differential backup is performed is limited by the storage capacity of the control memory.

Such problem is not limited to differential backup and is also encountered in the case of a backup of a type such that restoration cannot be performed if the information that is necessary for the restoration (referred to hereinbelow as "information necessary for restoration"), such as differential data information, is absent (for convenience, such backup will be referred to hereinbelow as "partial backup"), for example, when an incremental backup is performed.

SUMMARY

Accordingly, an aspect of the present invention enables the backup and restoration that do not require a backup server and can restore data that are partially backed up, even when the information necessary for restoration is absent in the storage subsystem performing the backup.

Another aspect of the present invention prevents the number of generations that can be differentially managed from being limited to the storage capacity of the memory of the storage subsystem.

Other aspects of the present invention will become clear from the following description.

The storage system in accordance with the present invention has a plurality of storage devices of a sequential access type that are storage devices of a type that can process a sequential access at a high speed, but cannot process a random access at a high speed, and at least one storage device of a random access type that is a storage device of a type that can process a random access faster than the storage devices of a sequential access type, and backs up data located in a logical volume on the at least one storage device of a random access type in the storage devices of a sequential access type. This storage system comprises a full backup section that executes a full backup by which all data located in the logical volume are backed up from the logical volume to a sequential device group comprising the plurality of storage devices of a sequential access type, a differential management information storage section that stores differential management information that is information representing a difference between the logical volume and the sequential device group after the full backup, a differential management section that updates the differential management information in response to an update of the logical volume, and a partial backup section that executes a partial backup by which partial data that are data equivalent to a difference between the logical volume and the sequential device group are specified by using the updated differential management information, information necessary for restoration that is necessary to restore a data group located in the updated logical volume by using the partial data is recorded in the sequential device group, and the partial data are backed up from the updated logical volume to the sequential device group. A variety of storage devices such as hard disks and flash memories can be employed as the storage devices of a random access type. Likewise, a variety of storage devices such as magnetic tapes can be employed as the storage devices of a sequential access type.

This storage system can be configured, for example, using one or a plurality of storage subsystems. For example, a higher-level device such as a host computer or another storage subsystem may be connected to one storage subsystem.

Furthermore, new data relating to the logical volume may be written into the logical volume or they may be written into a separate logical volume associated with the logical volume. In the latter case, the updated logical volume can be a combination of the logical volume and the separate logical volume.

In the first embodiment, the partial backup section includes the updated differential management information in the information necessary for restoration. The differential management section resets the updated differential management information in the case where the partial backup is conducted, and updates the reset differential management information in the case where the logical volume is thereafter updated.

In the second embodiment, the differential management information is a bitmap. Each bit of the bitmap corresponds to each volume portion of the logical volume. The partial backup section includes a storage size of the volume portion corresponding to the bit of the bitmap and a storage capacity of the logical volume in the information necessary for restoration.

In the third embodiment, a backup management storage section is further provided, and this backup management storage section stores backup unit management information representing, as a backup unit, a storage area of the sequential device group, that has been consumed by a backup to the sequential device group.

In the fourth embodiment, the configuration of the third embodiment further comprises a backup unit management section that adds, to the backup unit management information, information representing, as one backup unit, the storage area that has been consumed by the backup when the full backup or the partial backup is completed.

In the fifth embodiment, at least one storage device of a random access type of the fourth embodiment has a plurality of logical volumes. The partial backup section performs the partial backup with respect to each of the plurality of logical volumes. The backup unit management section takes a storage area comprising each data that is recorded by each partial backup as the backup unit.

In the sixth embodiment, in the configuration of the fourth embodiment, the backup unit management section includes a backup unit identifier, a backup class representing a class of backup, and a sequence information representing a sequence of backup for each backup unit in the backup unit management information. The partial backup section specifies a backup unit having recorded therein backup of data necessary for restoration of the partial backup based on sequence information and backup class in the backup unit management information and includes a backup unit identifier of the specified backup unit and a backup class indicating that this is a partial backup in the information necessary for restoration.

In the seventh embodiment, the partial backup section records the information necessary for restoration on the upstream side of the sequential device group from the partial data.

In the eighth embodiment, the partial backup section records the information necessary for restoration and the partial data on the downstream side from all the data that are recorded by the full backup.

In the ninth embodiment, a restore section is further provided that restores the updated logical volume by using the information necessary for restoration that is recorded in the sequential device group.

In the tenth embodiment, in the configuration of the ninth embodiment, the differential management information is a bitmap. Each bit of the bitmap corresponds to each volume portion of the logical volume. The partial backup section includes a storage size of the volume portion corresponding to the bit of the bitmap and a storage capacity of the logical volume in the information necessary for restoration. The restore section restores the updated logical volume based on the storage size and the storage capacity contained in the information necessary for restoration.

In the eleventh embodiment, the logical volume is a secondary logical volume from a volume pair comprising a primary logical volume, which is a copy source, and the secondary logical volume, which is a copy destination. The primary logical volume and secondary logical volume may be in one storage subsystem or in different storage subsystems.

In the twelfth embodiment, the partial backup is any one of a differential backup and an incremental backup.

In the thirteenth embodiment, the differential management information is a bitmap. Each bit of the bitmap corresponds to each volume portion of the logical volume. The partial backup section includes the updated bitmap, a storage size of the volume portion corresponding to the bit of the bitmap, and a storage capacity of the logical volume in the information necessary for restoration, records the information necessary for restoration and the partial data on the downstream side from all the data that are recorded by the full backup, and at this time records the information necessary for restoration on the upstream side of the sequential device group from the partial data. The differential management section resets the updated bitmap in the case where the partial backup is conducted and updates the reset bitmap in the case where the logical volume is thereafter updated. The partial backup is any one of a differential backup and an incremental backup.

In the fourteenth embodiment, in the configuration of the thirteenth embodiment, a bitmap for a differential backup and a bitmap for an incremental backup are present as the bitmap. In the case of the incremental backup, the bitmap for incremental backup is included.

The above-described storage sections can be configured of storage resources such as memories. Furthermore, other sections can be configured of hardware, computer programs, or combinations thereof (for example, some are implemented of computer programs and the rest of hardware). A computer program is executed by reading with a predetermined processor. Furthermore, a storage area present on a hardware resource such as a memory may be used appropriately during information processing performed by reading a computer program with a processor. A computer program may be installed from a recording medium such as a CD-ROM into a computer or may be downloaded into a computer via a communication network.

BRIEF DESCRIPTION OF THE DRAWINGS

FIG. 3 illustrates an example of management information held by Management 215 Volume Pair;

FIG. 5 shows an example of storage information of a tape group 411;

FIG. 6 shows an example of management information held by the Management 218 of Tape;

FIG. 7 shows an example of management information held by a Management 211 of Backup Data;

FIG. 19 shows a processing flow of Processing of Pair Re-Synchronizing (Usual); and FIG. 20 shows a processing flow of Processing of Pair Split.

DESCRIPTION OF THE PREFERRED EMBODIMENTS

Figure 1:
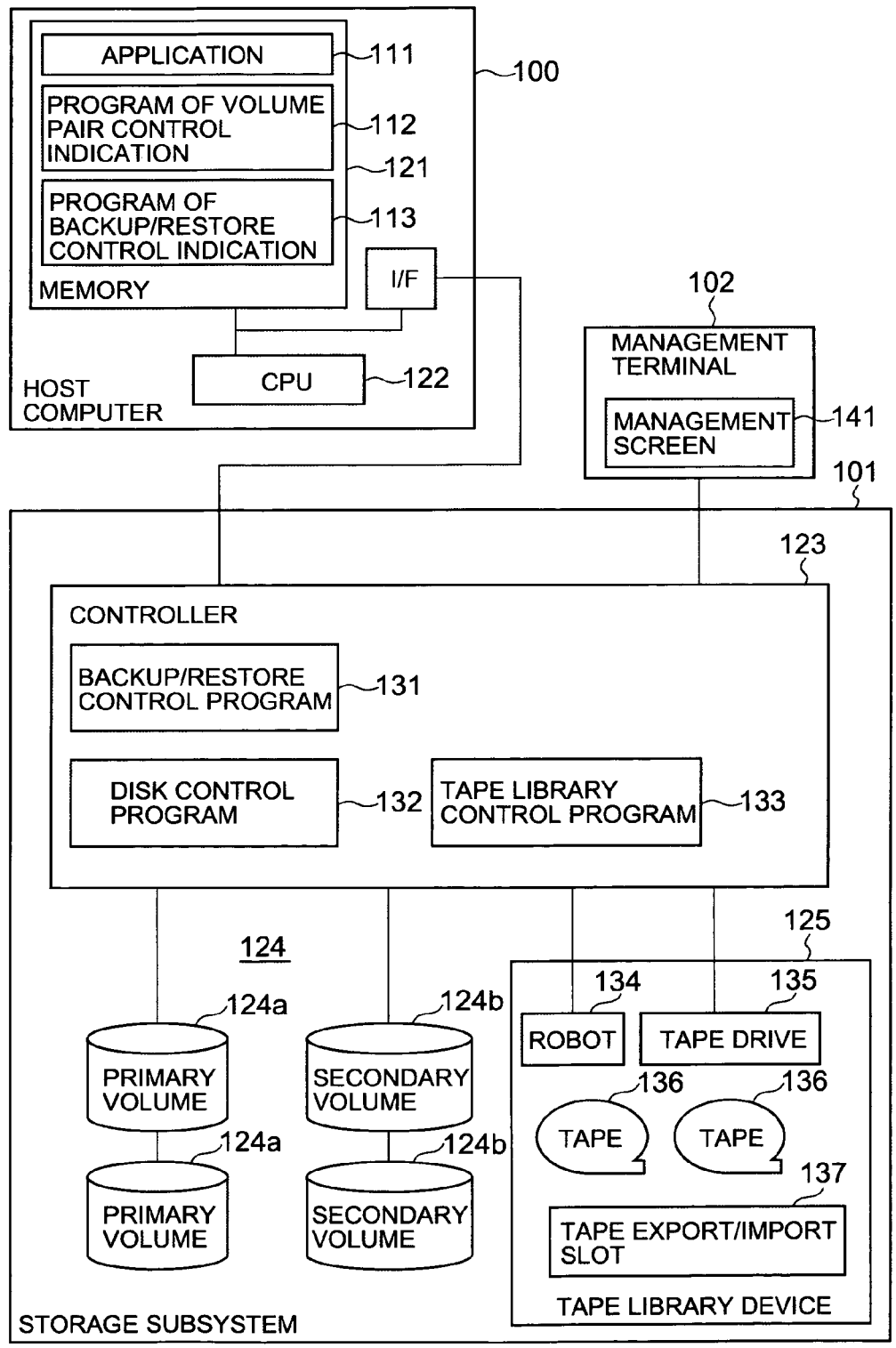
FIG. 1 is a configuration example of a computer system of the first embodiment of the present invention.

Several embodiments of the present invention will be described below with reference to the appended drawings. In the explanation below, three types of backup will be considered: full backup, differential backup, and incremental backup. Of the backups of those three types, the differential backup and incremental backup are backups of the types belonging to partial backup. When two or more backup types of the aforementioned three types of backup are referred to, they will be described by using a slash "/". For example, when all three types of backup are indicated, they will be described as full/differential/incremental backup. The symbol "/" herein is used in the meaning of "and/or".

Embodiment 1

For example, in the first embodiment, the storage system is one storage subsystem, the higher-level device is a host computer, the storage device of a random access type is a magnetic disk (referred to hereinbelow simply as "disk"), and the storage device of a sequential access type is a magnetic tape (referred to hereinbelow simply as "tape").

In the first embodiment, a management terminal connected to the storage subsystem is provided. Furthermore, a tape library device comprising a plurality of tapes and a controller that controls the disk and tape library device is provided in the storage subsystem.

The controller comprises a Disk Control Program that controls the disk, a Tape Library Control Program that controls the tape library device, and a Backup/Restore Control Program that performs copy control from the disk to the tape.

The tape library device comprises a robot that transfers the tapes, a tape drive that reads/writes (accesses) the tapes, and a tape export/import slot for exporting/importing the tapes from and to the tape library device.

The host computer comprises an application performing write/read of data from and to the storage subsystem, a Program of Volume Pair Control Indication that transmits a Volume Pair Control Indication to the storage subsystem, a Program of Backup/Restore Control Indication that transmits a Backup/Restore Control Indication to the storage subsystem, and a CPU that controls the application, Program of Volume Pair Control Indication, and Program of Backup/Restore Control Indication.

The Disk Control Program receives the Program of Volume Pair Control Indication from the host computer and performs the volume pair control of the disk in response to the Volume Pair Control Indication. The Backup/Restore Control Program receives the Backup/Restore Control Indication from the host computer, performs the backup from the disk to the tape and restoration from the tape to the disk in response to the Backup/Restore Control Indication, and at this time performs the management of backup data and backup differential data.

The Tape Library Control Program receives a Tape Import Indication from the management terminal, performs tape import in response to the Tape Import Indication, and also receives a Tape Export Indication from the management terminal and performs tape export in response to the Tape Export Indication.

More specifically, the Disk Control Program can create a pair of a primary volume and a secondary volume in the disk by the Volume Pair Control Indication. The Disk Control Program can perform differential data management of the primary volume and secondary volume and can perform differential data copying or pair splitting according to the Volume Pair Control Indication. The Backup/Restore Control Program can perform backup data differential management, can perform full/differential/incremental backup of the pair-split secondary volume to a tape according to the Backup Control Indication, and in the case of differential/incremental backup at this time, can store on the tape not only the data that are the object of backup but also the information necessary for restoration. The Backup/Restore Control Program can recover data from the full/differential/incremental backup data that are stored in the tape to the pair-split secondary volume according to the Restore Control Indication, and in the case of restoration from the differential/incremental backup data at this time, can restore data by using the information necessary for restoration that has been stored on the tape. The Disk Control Program can copy the secondary volume for which data restoration has been performed to the primary volume according to the Volume Pair Control Indication. Furthermore, data restoration can be performed from the full/differential/incremental backup data that are stored on the tape even in the storage subsystem other than the storage subsystem where the backup has been performed. This is because the information necessary for restoration has been recorded on the tape. The Tape Library Control Program can export a tape from the storage subsystem according to the Tape Export Indication. The Tape Library Control Program can import a tape into the storage subsystem according to the Tape Import Indication and also can restore data from the imported tape.

The first embodiment will be described below in greater detail.

Figure 2:
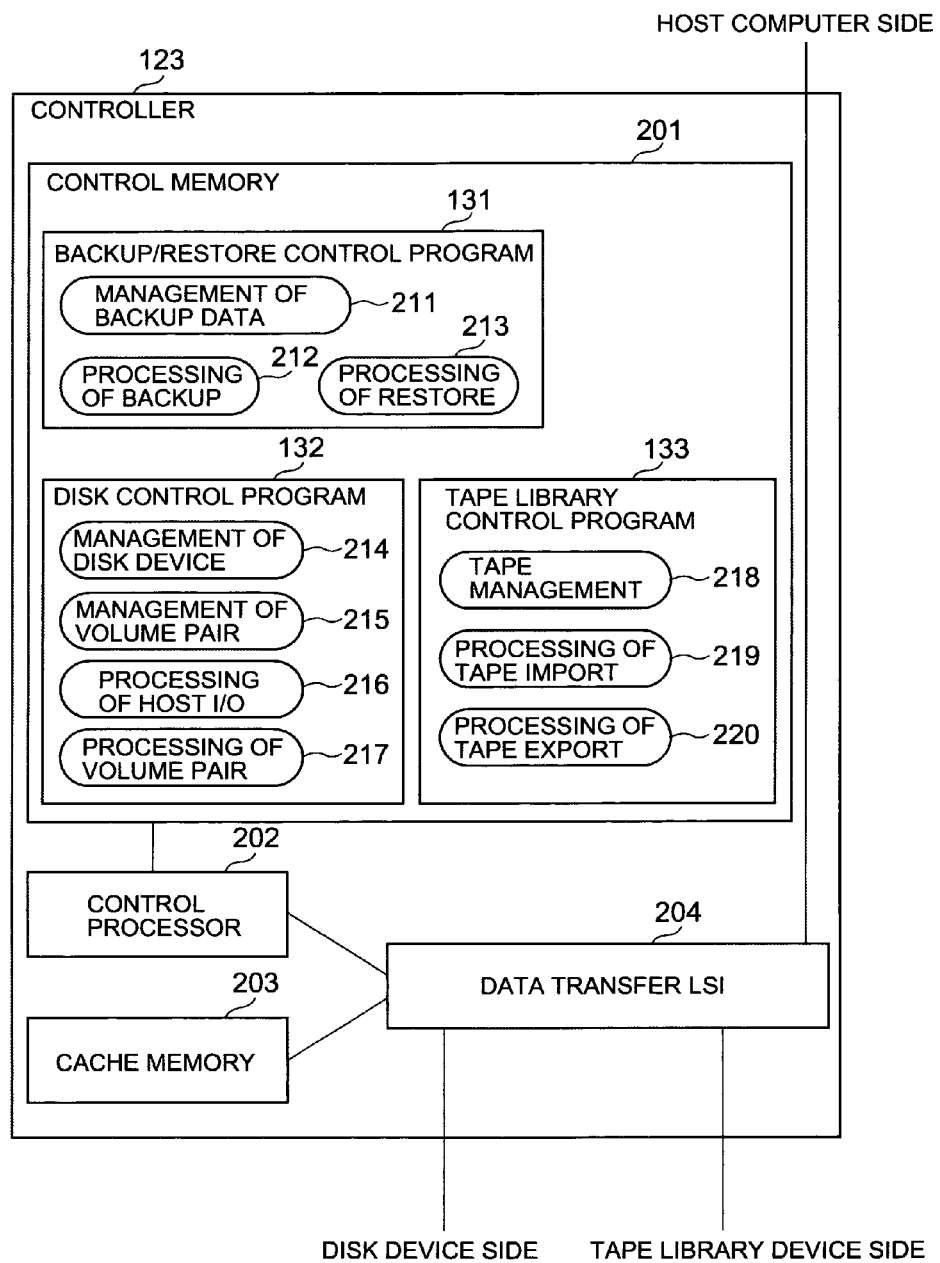
FIG. 2 illustrates a configuration example of a controller 123 of a storage subsystem 101.

FIG. 1 shows an exemplary configuration of a computer system of the first embodiment of the present invention. FIG. 2 shows an exemplary configuration of a controller 123 of the system shown in FIG. 1.

A host computer 100, a storage subsystem 101, and a management terminal 103 are connected by using a fiber channel and can exchange information and processing requests. The host computer 100, storage subsystem 101, and management terminal 103 may be connected by a communication network such as LAN (Local Area Network) or may be connected by a special line or the like.

The host computer 100 comprises an application 111 that writes information to the storage subsystem 101 and reads information therefrom, a Program 112 of Volume Pair Control Indication that issues a Volume Pair Control Indication, a Program 113 of Backup/Restore Control Indication that issues a Backup/Restore Control Indication, a memory 121 for storing the application 111, Program 112 of Volume Pair Control Indication and Program 113 of Backup/Restore Control Indication, and a CPU (Central Processing Unit) 122 for executing the application 111, Program 112 of Volume Pair Control Indication and Program 113 of Backup/Restore Control Indication. The CPU 122 executing the Program 112 of Volume Pair Control Indication issues a variety of commands such as Pair Create Indication, Pair Re-synchronize Indication, Pair Split Indication, and Pair Delete Indication. When a program is hereinbelow a subject, it actually means processing performed by the CPU executing the program. The Program 113 of Backup/Restore Control Indication issues various commands such as Bull Backup Start Indication, Differential Backup Start Indication, Incremental Backup Start Indication, and Restore Start Indication.

The storage subsystem 101 comprises a controller 123, a plurality of disks 124, and a tape library device 125. The controller 123 comprises a Program 131 of Backup/Restore Control that performs Management of Backup Data, Processing of Backup, and Processing of Restore, a Disk Control Program 132 that performs Management of Data, Management of Volume Pair, Processing of Host I/O, and Processing of Volume Pair, and a Tape Library Control Program 133 that performs Management of Tape, Processing of Tape Import, and Processing of Tape Export.

The tape library device 125 comprises a plurality of tapes 136, a robot 134 that transfers the tapes 136, a tape drive 135 that writes information on the tape 136 and reads information therefrom, and a tape export/import slot 137 for taking the tape 136 out of the storage subsystem 101 and inserting the tape thereinto.

The Disk Control Program 132 has a function of creating a volume pair composed of a primary volume 124a and a secondary volume 124b and also has functions of pair re-synchronizing that performs differential data copying between the volumes, pair splitting that splits the volumes, and pair deletion that deletes a volume pair. The Disk Control Program 132 comprises a program 214 for performing management of disk 124, a program 215 for performing management of volume pair, a program 216 for processing I/O, e.g., writing and reading information from the host computer 100, and a program 217 for processing a volume pair. The term "volume" as used herein stands for a logical volume, which is a logical storage device, more specifically, for a storage space portion that is cut out from a storage space provided by one or a plurality of disks 124 (for example, two or more disks 124 constituting a RAID group). The "primary volume" is a logical volume of copy source, and the "secondary volume" is a logical volume of copy destination.

The Backup/Restore Control Program 131 includes a program 211 that performs management of backup data, a program 212 that performs processing of backup, and a program 213 that performs processing of restore. Management 211 of Backup Data has a function of managing backup data and also has a function of managing differential data of backup for performing differential/incremental backup. Furthermore, the Backup/Restore Control Program 131 has a function of performing full/differential/incremental backup of information of the secondary volume 124b on the tape 136 or restoring the information of tape 136 to the secondary volume 124b. It goes without saying, that the backup source and restore destination may be the primary volume 124a or the disk 124 that does not constitute a volume pair.

The Tape Library Control Program 133 comprises a program 218 that performs management of tape 136, a program 219 that performs processing of tape import, and a program 220 that performs processing of tape export. The Tape Library Control Program 133 has a function of exporting the tape 136 and a function of importing the tape by using the tape export/import slot 137.

The management terminal 102 includes a management screen 141 and performs of managing the storage subsystem 101. For example, the management terminal creates a logical volume (referred to hereinbelow as LU) of the disk 124 and issues an Export/Import Indication of tape 136. The management screen 141 is, for example, a display screen of a display device (not shown in the figure) of the management terminal 102.

The controller 123 comprises a memory (referred to hereinbelow as "control memory") 201 for storing the Backup/Restore Control Program 131, Disk Control Program 132, and Tape Library Control Program 133, a processor (for example, a CPU; referred to hereinbelow as "control processor") 202 for executing the Backup/Restore Control Program 131, Disk Control Program 132, and Tape Library Control Program 133, a cache memory 203 for storing information temporarily, and a data transfer LSI (Large Scale Integration) 204 for performing data transfer between the host computer 101, disk 124, and tape library device 125.

FIG. 3 shows an example of management information held by the Management 215 of Volume Pair.

For example, a Volume Pair Management Table 301, a Volume Pair Differential Management Table 302, and a Volume Pair Differential Management Bitmap 303 are contained in the management information held by the Management 215 of Volume Pair.

The Volume Pair Management Table 301 serves to manage the configuration information or status of a volume pair created by Processing 217 of Volume Pair. In this Table 301, a volume pair number 311, a primary volume 312, a secondary volume 313, and a status 314 are recorded for each volume pair. The volume pair number 311 is a number uniquely identifying a volume pair. The primary volume 312 is a LUN (logical unit number) of a LU (logical unit) serving as the primary volume 124a. The secondary volume 313 is a LUN of a LU serving as the secondary volume 124b. The status 314 is the volume pair status such as a pair status, a split status, a status of transition to a pair status, a status of transition to a split status, or an error status. The pair status is a status in which the information of the primary volume 124a and the information of the secondary volume 124b are synchronized. The split status is a status in which the information of the primary volume 124a and the information of the secondary volume 124b are not synchronized. The status of transition to a pair status is a status in which transition processing is made to a pair status.

The Volume Pair Differential Management Table 302 serves to manage the difference between the primary volume 124a and secondary volume 124b for each volume pair. This difference is managed, for example, by a Volume Pair Differential Management Bitmap 303. In this Table 302, a volume pair number 321, a differential bitmap number 322, a differential management size 323, and a differential bitmap storage position 324 are recorded for each volume pair. The volume pair number 321 indicates which volume pair has the differential bitmap. The differential bitmap number 322 is a number that uniquely identifies the Volume Pair Differential Management Bitmap 303. The differential management size 323 indicates the size to which one bit of the differential bitmap corresponds. The differential bitmap storage position 324 indicates where on the disk 124 the differential bitmap is stored. For example, if the differential bitmap storage position 324 is 0:0-0:1000, it indicates that the bitmap is stored from LBA 0 to 1000 in the LU with a LUN=0. The bit map storage position may be stored on the control memory 201 or cache memory 203, rather than on the disk 124, to increase the reference rate.

For example, if the differential management size 323 is 1 MB, then 331a indicates a differential bit of a block corresponding to 1 MB from the head section of the LU, and 331b indicates the differential bit of a block corresponding to 2 MB from 1 MB of the head section of the LU. The differential bit 331 is any one of the corresponding blocks, and if the information of the primary volume 124a is different from that of the secondary volume 124b, the bit is inverted. For example, 331a, 331b, 331e indicate that the information of the primary volume 124a and the information of the secondary volume 124b match, and 331c and 331d indicate that the information of the primary volume 124a and the information of the secondary volume 124b do not match. The primary volume 124a and secondary volume 124b each have one differential bitmap. As for the differential bit 331, if any one of the corresponding blocks is updated, the differential bit is inverted, and the differential data of the primary volume 124a and secondary volume 124b may be managed by comparing the respective differential bitmaps. The differential bitmap size is determined by the LU capacity and differential management size 323. For example, if the LU capacity is 100 MB and the differential management size 323 is 1 MB, then the size of one differential bitmap will be 100 bit.

Figure 4:
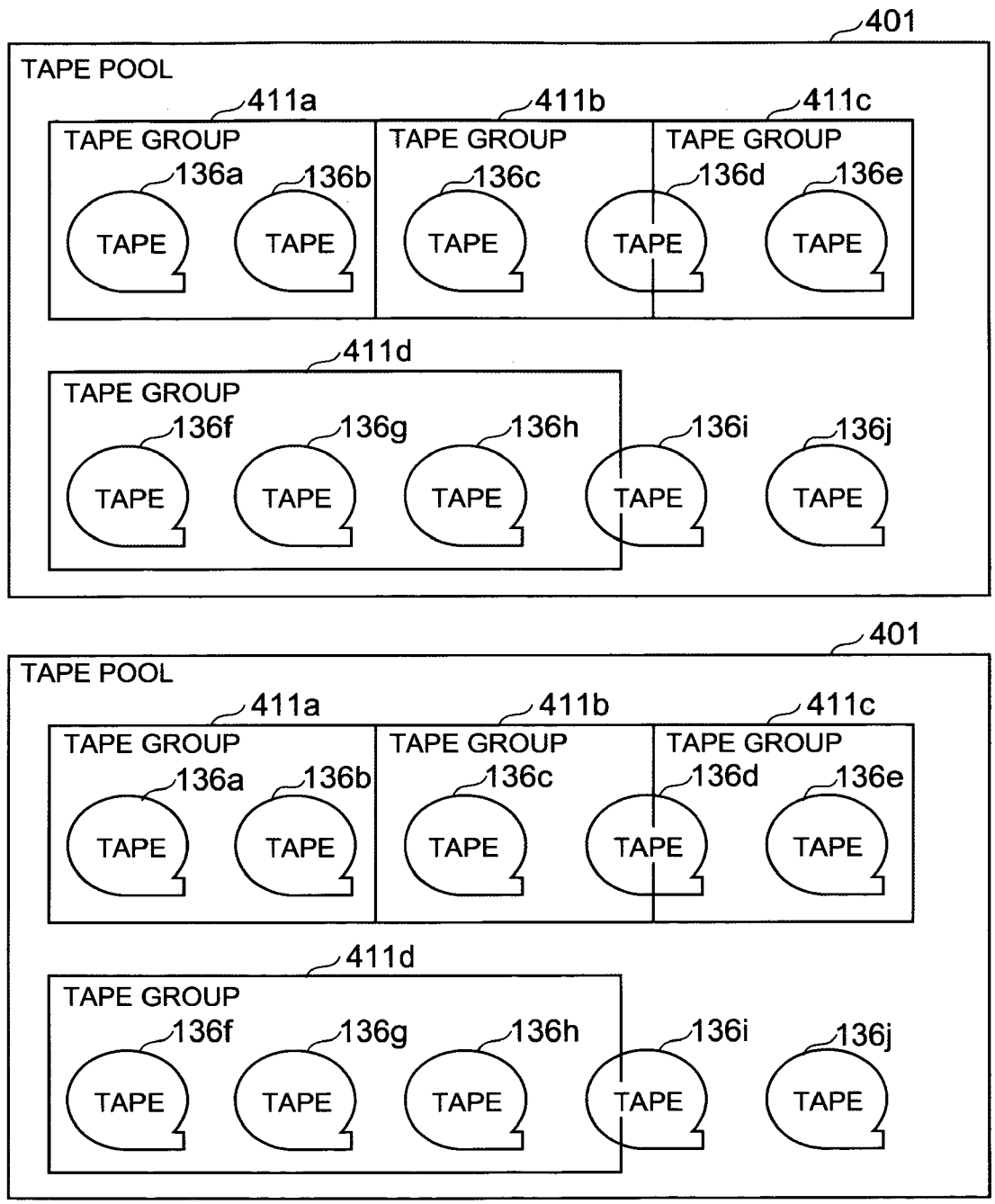
FIG. 4 shows an example of logical image of a tape pool 401 managed by Management 218 of Tape.

FIG. 4 shows an example of logical image of a tape pool 401 managed by Management 218 of Tape.

The tape pool 401 comprises a plurality of tapes 136, and some of the tapes 136 are grouped, constituting a tape group 411. There are also tapes, such as a tape 136j, that are not grouped into the tape group 411. For example, a tape group 411a is composed of a tape 136a and a tape 136b. Half a tape, as in a tape 136d, maybe used in a tape group 411b and the remaining half may be used in a tape group 411c. Furthermore, the tape group 411 is not necessarily composed of two or more tapes 136. For example, the tape group 411 may be also composed of one tape 136 or part of the tape 136. In FIG. 4, a plurality of tape pools 401 are shown, all the tape pools 401 having the same configuration. However, it goes without saying that each tape pool 401 may have different configuration.

The tape pool 401 is created in the units of the tape library device 125 by using the management terminal 102. The tape pool 401 is composed of the tapes 136 of the tape library device 125. The creation of the tape pool 401 may be conducted from the host computer 100. A plurality of tape pools 401 may be created in the tape library device 125, or the tape pool may be created for a plurality of tape library devices 125. In backup processing, the tape pool 401 is indicated as a backup destination, and backup is successively conducted to the tape that is not used. A plurality of backup source volumes may be indicated. The tape that is used for backup may be a tape in which absolutely no data have been recorded, that is, a completely unused tape. For example, in the backup, data may be overwritten on the tape where data that require no backup have been recorded, and the process may be continued to a certain point on the tape where the backup data have been recorded. The tape group 411 is created by grouping the tapes used in the backup. Accordingly, the backup unit becomes a tape group 411, and the management of backup data is conducted in tape group units. The tape group 411 may be created by using the management terminal 102 or the like prior to backup and the tape group 411 may be indicated as a backup destination. The created tape group 411 has a function of adding, if necessary, a tape that does not constitute the tape group 411, such as tape 136j. For example, the tape group 411a that is created in advance is indicated as a backup destination, but when backup data have not yet been entered into the tape 136a and tape 136b, the backup data remaining in the tape 136j are stored, and the tape group 411a is constituted of tapes 136a, 136b, 136j.

During the backup, a tape area (recording area of the entire or part of one or a plurality of tapes 136) for constituting the tape group 411 may be reserved in advance from the tape pool 411 based on the size of data that are the backup object and the size of the management information (information including the information necessary for restoration) that will be stored together with the data and the backup may be conducted into this reserved tape area, but constituting the tape group 411 when the backup has been completed, as in the present embodiment, is more efficient. This is because, the size of data to be written into the tape 136 is not known before the backup is completed. The primary factor therefore is that the data to be written into the tape 136 are compressed by the function of the tape drive 135. In other words, the size of data recorded on the tape 136 is actually less than the size of data sent as the write object to the tape drive 135. For this reason, even if the tape 136 is reserved in advance, the capacity can be too large or, conversely, insufficient. In the present embodiment, the occurrence of such problem is avoided by constituting the tape group 411 after the backup has been completed.

Furthermore, as shown in FIG. 4, a plurality of tape groups 411 are linked into one tape pool 401, but when a plurality of backup operations are conducted with respect to a certain backup source LU, those after the backup time are backed up at the position downstream of those before the backup time. For example, when differential backup is conducted after the full backup, the differential backup may be performed from a position downstream (for example, immediately thereafter) of the tape pool corresponding to the full backup. Furthermore, for example, when incremental backup is performed after the differential backup, the incremental backup may be performed from a position downstream (for example, immediately thereafter) of the tape pool corresponding to this differential backup. Such an approach makes it possible to avoid frequent forwarding and rewinding of the tape during the restoration.

FIG. 5 shows an example of storage information of the tape group 411.

The tape group 411 comprises tape group information 501 and backup data 502. The backup data 502 comprise data management information 511 and data 512. The tape group information 501 is management information of the tape group 411 that has to be restore processed.

The backup data 502 is backup data of the backup source LU. The data management information 511 is management information of the backup source LU that has to be restore processed. The data 512 is user's data (data used in the application 111 of the host computer 100) of the backup source LU (secondary volume serving as a backup source). Thus, the "backup data" as referred to in the present embodiment can be a combination of user's data and data management information. The tape group information 501 and tape management information 511 will be explained below with reference to FIGS. 8, 9 and 10.

FIG. 6 shows an example of management information of the Management 218 of Tape.

The management information includes a Tape Pool Management Table 601, a Tape Group Management Table 602, and a Tape Media Management Table 603.

The Tape Pool Management Table 601 is a table for managing the tape pool 401. A tape pool number 611, a number 612 of the tape constituting the tape pool, and a storage tape group number 613 are recorded in the Table 601. The tape pool number 611 is a number for uniquely identifying the tape pool 401. The tape number 612 is the number of the tape constituting the tape pool 401. The tape numbers may be recorded in the sequence of 101,102, 103, or the numbers 111-131 may be recorded to reduce the table capacity and the configuration may include tapes with the numbers from the tape number 111 to the tape number 131. Furthermore, recording may be conducted by a combination of the former and the latter. The storage tape group number 613 is the number of the tape group 411 that has been created in the tape pool 401. For example, the tape pool 401 with the tape pool number 1 is composed of tapes 136 with the tape numbers 101,102,103, and the tape groups 411 with the tape group numbers 11, 12, 13 are created.

The Tape Group Management table 602 is a table for managing the tape group 411. A tape group number 621, a tape group status 622, tapes 623 constituting the tape group, a backup source LUN 624, a backup data class 625, a tape group number 626 necessary for restoration, a number 627 of the tape pool to which the tape group belongs, and the recording date and time 628 are recorded in the Table 602. The tape group number 621 is a number for uniquely identifying the tape group 411. The tape group status 622 indicates the status of the tape group, such as "Normal", "Backup is conducted", "Restoration is conducted", and "Error". The tape group configuration tape 623 is information representing the position of the tape group (position information), and this position information is represented, for example, by the tape number 631 and object address. 101:10-900 indicates the address from 10 to 900 of the tape number 101. The backup source LUN 624 indicates the LUS of the backup source LU (backup source volume). The backup data class 625 indicates whether the data are the full backup data, differential backup data, or incremental backup data. The tape group number 626 necessary for restoration indicates the tape group number 621 that is necessary during the restoration. The tape pool number 627 indicates the tape pool number 611 to which the tape group 411 belongs. The recording date and time 628 indicates date and time when the backup is started. The recording date and time 628 may record the backup end date and time or the indicated date and time during the Processing of Backup.

For example, it can be assumed that full backup is performed at 22:00:00 of Apr. 4, 2006, differential backup is performed at 22:00:00 of Apr. 11, 2006, and incremental backup is performed at 22:00:00 of Apr. 12, 2006. In the tape group 411 of the tape group number 11, the LU of LUN 2001 and 2002 are recorded at 22:00:00 of Apr. 4, 2006 and the full backed-up data are recorded in the tape numbers 101, 102, 103. In the tape group 411 of the tape group number 12, the LU of LUN 2001 and 2002 are recorded at 22:00:00 of Apr. 11, 2006 and the differential backed-up data are recorded in the tape numbers 104, 105. In the tape group 411 of the tape group number 13, the LU of LUN 2001 and 2002 are recorded at 22:00:00 of Apr. 12, 2006 and the incremental backed-up data are recorded in the tape numbers 106. In order to perform Processing of Restore from the full backed-up data of the tape group 411 of the tape group number 11, only the tape group 411 of the tape group number 11 may be employed. Therefore, nothing is recorded in the tape group number 626 necessary for restoration. In order to perform Processing of Restore from the differential backed-up data of the tape group 411 of the tape group number 12, the tape group 411 of the tape group number 11 is also necessary. Therefore, 11 is recorded in the tape group number 626 necessary for restoration. In order to perform Processing of Restore from the incremental backed-up data of the tape group 411 of the tape group number 13, the tape groups 411 of the tape group numbers 11 and 12 are also necessary. Therefore, 11 and 12 are recorded in the tape group number 626 necessary for restoration. In this case, in the Processing of Restore, the copy processing of the tape group 411 (copying from the tape to the restore destination volume) is conducted in the order to tape group numbers of 11, 12, 13. If the tape group number 621 of the tape group 411 where the backup data of the previous cycle have been recorded is recorded in the tape group number 626 necessary for restoration, for example, if a restore request is issued by indicating the tape group 411 of the tape group number 13, then the tape group number 626 necessary to restore the tape group number 13 is referred to, thereby clarifying the necessity of conducting the copy processing of the tape group 411 of the tape group number 12 prior thereto, then the tape group number 626 necessary to restore the tape group number 12 is referred to, thereby clarifying the necessity of conducting the copy processing of the tape group 411 of the tape group number 11 prior thereto, then the tape group number 626 necessary to restore the tape group number 11 is referred to, thereby clarifying that the tape group number 621 is the full backup data, and the copy processing of the tape group 411 may be conducted in the order to tape group numbers of 11, 12, 13.

The Tape Media Management Table 603 is a table for managing the tapes 136. A tape number 631, a tape class 632, one block size 633, a tape capacity 634, a used capacity 635, a tape status 636, a number 637 of the tape pool to which the tape belongs, and a number 638 of the tape group to which the tape belongs are recorded in the Table 603. The tape number 631 is a number for uniquely identifying the tape 136. The tape class 632 indicates a tape standard such as LTO3 or LTO4. One block size 633 indicates the capacity of one block of the tape 136. The tape capacity 634 indicates the capacity of tape 136. Used capacity 635 indicates that backup data capacity that has been recorded in the tape 136. The tape status 636 indicates the status of tape 136, such as "Normal", "Not used", and "Error". For example, "Normal" indicates the status in which backup data have been recorded normally, "Not used" indicates the status in which the backup data have not been recorded, and "Error" indicates the status in which the tape 136 cannot be used due to media failure or the like. The tape pool number 637 indicates the tape pool number 611 to which the tape 136 belongs. The tape group number 638 indicates the tape group number 621 to which the tape 136 belongs. For example, the tape 136 of the tape number 101 has the backup data recorded therein and belongs to the tape pool 401 of the tape pool number 1 and to the tape group 411 of the tape group number 11. The tape 136 of the tape number 111 has no backup data recorded therein and belongs to the tape pool 401 of the tape pool number 4.

FIG. 7 shows as example of management information of the Management 211 of Backup Data.

This management information includes a Backup Data Management Table 701, a Data Differential Management Table 702, and a Backup Data Differential Management Bitmap 703.

The Backup Data Management Table 701 is a table for managing the backup data. A backup data number 711, a backup source LUN 712, a backup destination tape group number 713, a backup data status 714, a backup data class 715, and a backup acquisition date and time 716 are recorded in this Table 701. The backup data number 711 is a number for uniquely identifying the backup data. The backup source LUN 712 indicates the LUN of the backup source LU. The backup destination tape group number 713 indicates the tape group number 621 where the backup data have been recorded. The backup data status 714 indicates the status of backup data, such as "Normal", "Restore impossible", and "Error". For example, "Normal" represents a status in which the backup data can be recorded. "Restore impossible" indicates a status in which the backup data have been lost and restoration is impossible, but represents a status in which the tape 136 can be used. "Error" represents a status in which the tape 136 cannot be used due to a tape media failure. The backup data class 715 indicates the full backup data, differential backup data, or incremental backup data. The backup acquisition date and time 716 indicates the date and time where the backup is started. In the backup acquisition date and time 716, the backup end date and time may be recorded or date and time indicated during Processing of Backup may be recorded.

The Data Differential Management Table 702 and Backup Data Differential Management Bitmap 703 serve to perform data differential management for performing differential/incremental backup. The differential data management is performed by the differential bitmap for each backup source LU. It goes without saying, that the differential data may be managed by other method, for example, with a differential data list, rather than with the differential bitmap. For example, in the full/differential/incremental backup operation in which full backup is performed at the beginning of each month, incremental backup is performed on workdays, and differential backup is performed on Sundays, the differential backup and incremental backup cannot be combined with one differential bitmap. Therefore, two differential bitmaps for differential backup and incremental backup are provided for each backup source LU.

LUN 721, a differential bitmap number 722, a backup class 723, a differential management size 724, and a differential bitmap storage position 725 are recorded in the Data Differential Management Table 702. The LUN 721 indicates a LUN of the LU where differential data management is conducted (in other words, a secondary volume that is the object of differential data management). The differential bitmap number 722 is a number that uniquely identifies the Data Differential Management Bitmap 703. The backup class 723 indicates whether the corresponding differential bitmap is for differential backup or for incremental backup. The differential management size 724 indicates the size to which one bit of the differential bitmap corresponds. The differential bitmap storage position 725 indicates where in the disk 124 the differential bitmap has been stored. For example, if the differential bitmap storage position 725 is 5:0-5:1000, it indicates that the differential bitmap has been stored from LBA 0 to 1000 of the LU with a LUN of 5. The storage position of the differential bitmap may be on the control memory 201 or on the cache memory 20, rather than on the disk 24, to accelerate the reference rate.

In the Data Differential Management Bitmap 703, for example, if the differential management size 724 is 1 MB, then 731a indicates a differential bit of a block corresponding to 1 MB from the head section of the LU and 731b—from 1 MB to 2 MB from the head section of the LU. If any one of the corresponding blocks has been updated, the differential bit is inverted. For example, in the present representation, 731a, 731b, 731e have not been updated, 731c, 731d have been updated, and during the differential/incremental backup, the blocks corresponding to 731c, 731d are the backup objects. At the time of full backup end, the differential bitmaps for differential backup and incremental backup are reset. At the time of the differential backup and incremental backup end, only the differential backup for incremental backup is reset. The size of the differential bitmap is determined by the capacity of LU and the differential management size 724. For example, if the LU capacity is 100 MB and the differential management size 724 is 1 MB, then the size of differential bitmap is 100 bit.

Figure 8:
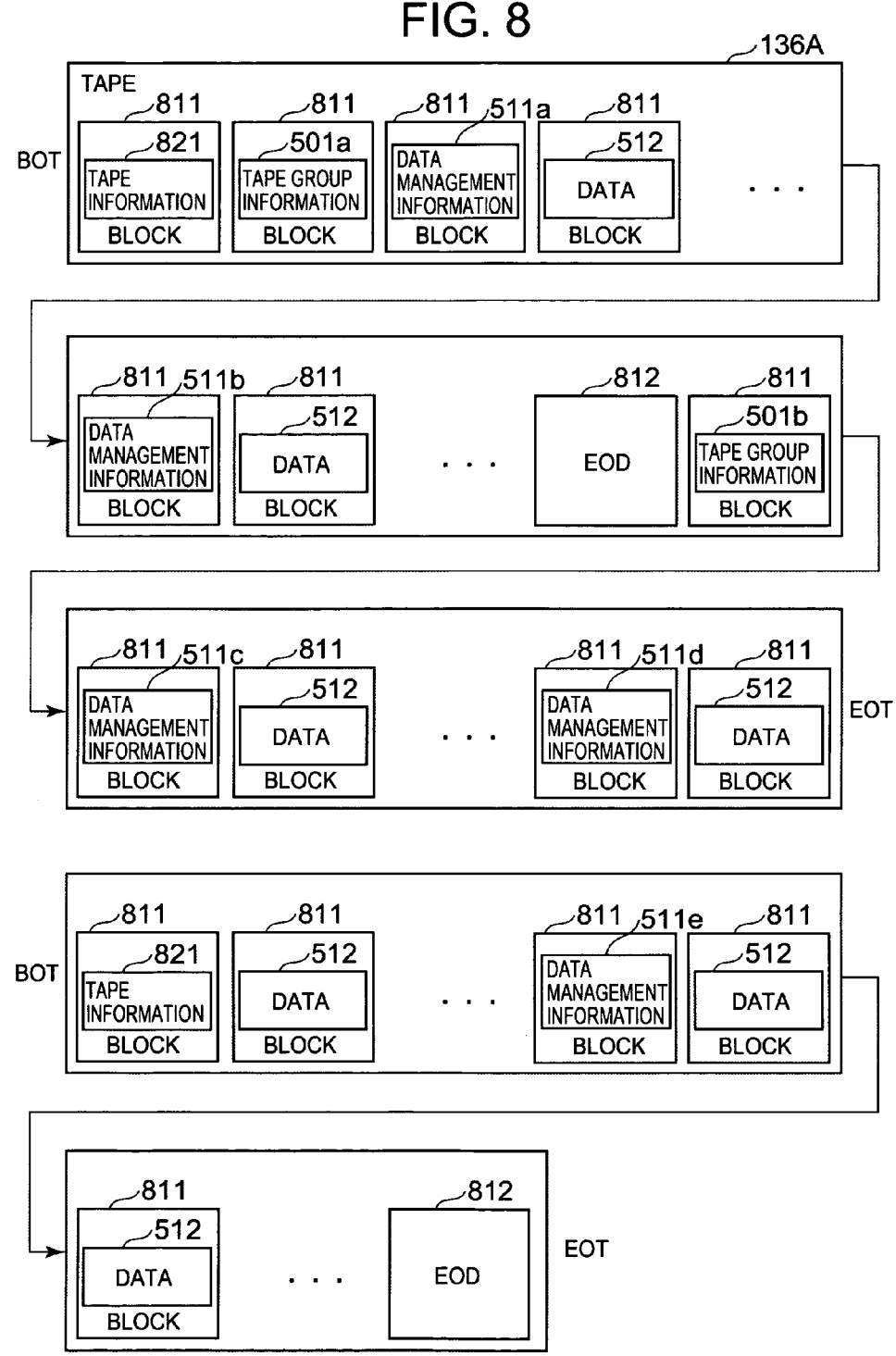
FIG. 8 shows an example of recording format of a tape 136.
Figure 9:
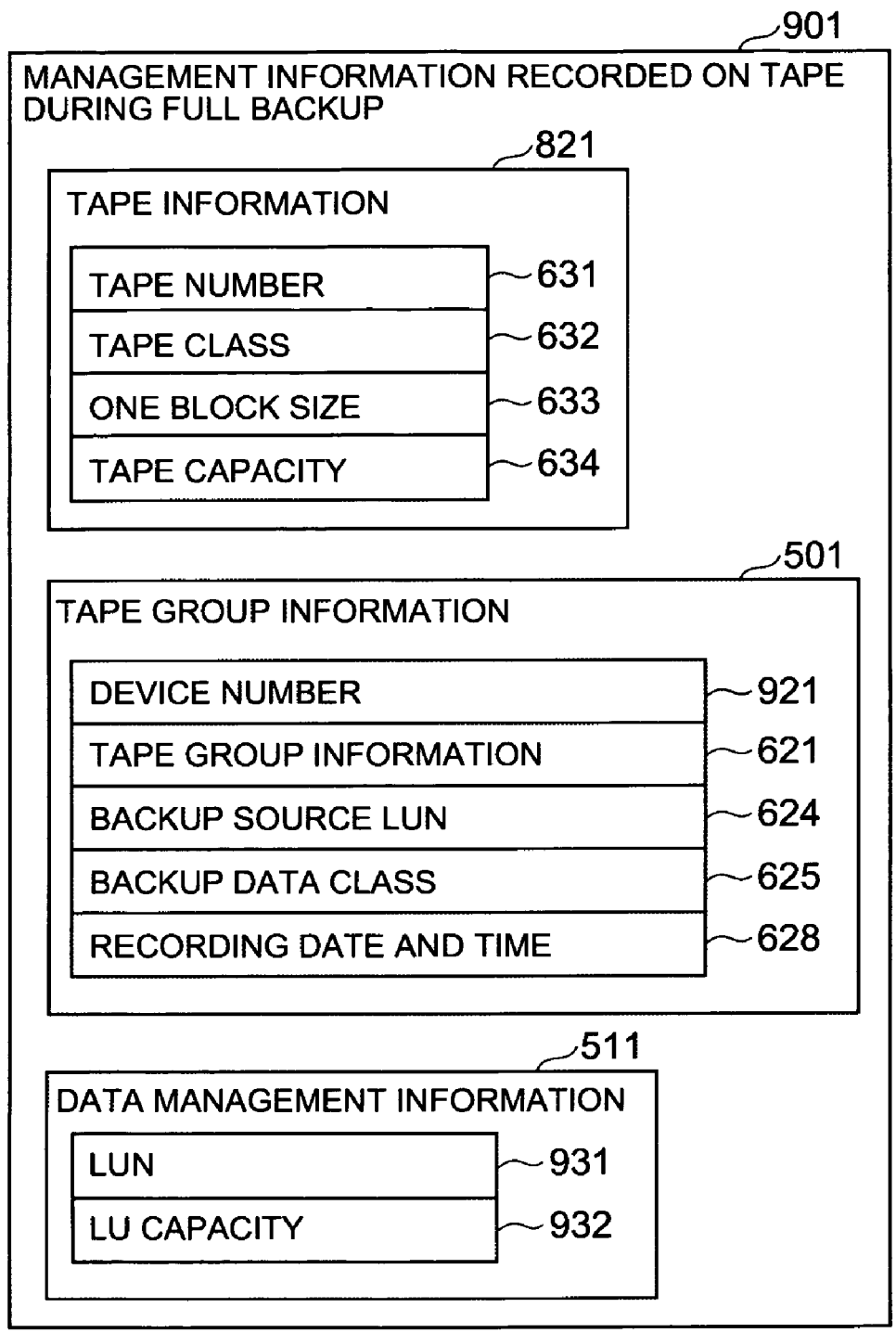
FIG. 9 shows an example of management information recorded on a tape during full backup.
Figure 10:
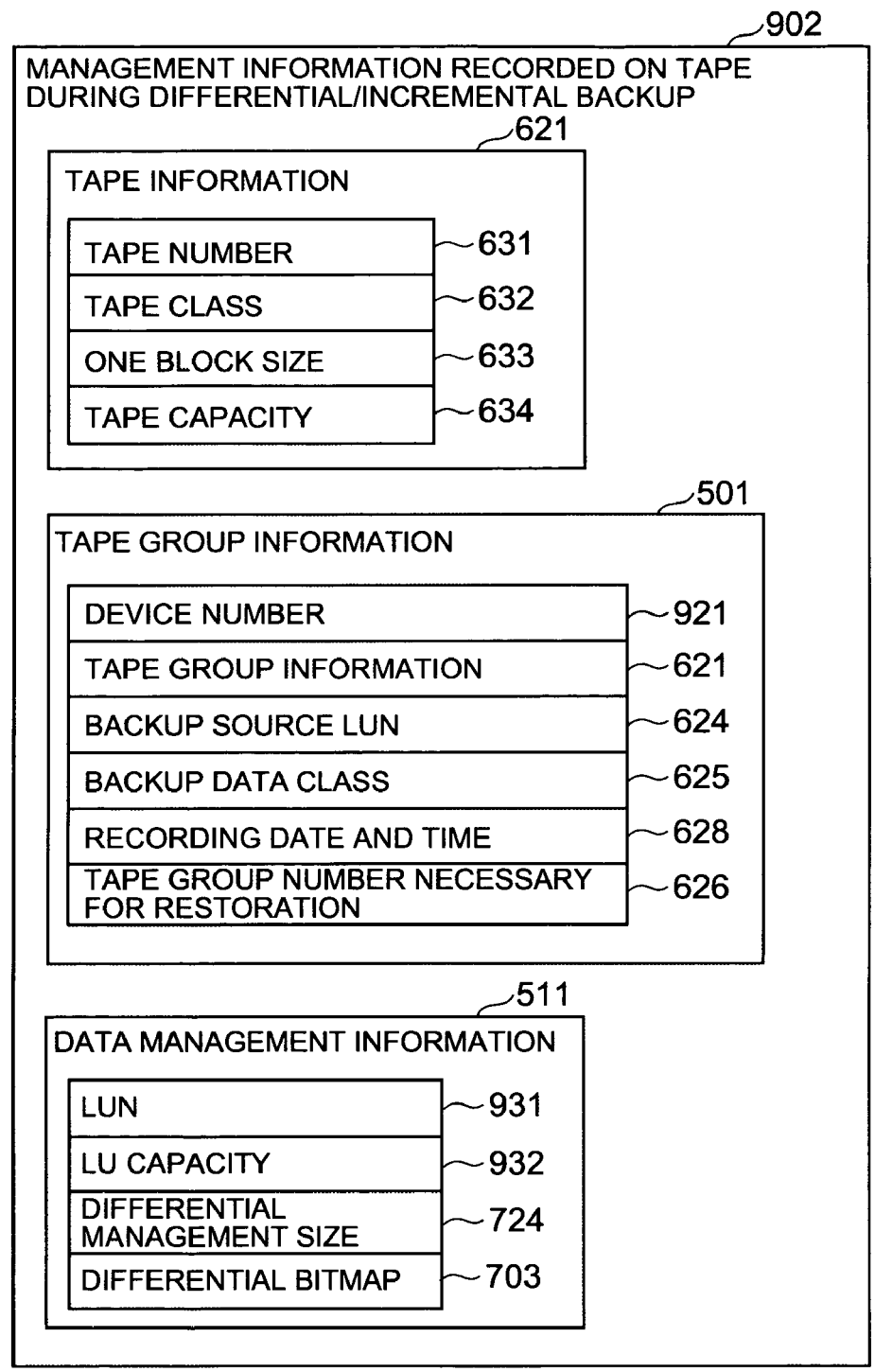
FIG. 10 shows an example of management information recorded on a tape during differential/incremental backup.

FIG. 8 shows an example of recording format of the tape 136. FIG. 9 shows an example of management information to be recorded on the tape during full backup. FIG. 10 shows an example of management information to be recorded on the tape during differential/incremental backup. The management information to be recorded on the tape during backup records the management information held by the control memory 201.

A plurality of blocks 811 and a plurality of EOD (End Of Data) 812 are recorded on the tape. A block number identifying each block 811 is attached to the block 811, and the block number is a number that is increased by 1 in the order of 1, 2, 3 . . . from the BOT (Beginning Of Tape) of tape 136 to the EOT (End Of Tape) of tape 136. If a block 811 is recorded on the tape 136 immediately after the tape 136 is mounted on the tape drive 135, the block 811 is recorded where the block number is 1, and if the next block 811 is recorded, then the block 811 is recorded where the block number is 2. If other blocks 811 are then recorded, the blocks 811 are recorded successively where the block number is 3, where the block number is 4, . . . , toward the EOT side. Furthermore, If the block 811 is reproduced immediately after the tape 136 has been rewound, then the block 811 with the block number 1 is reproduced, and if the next block 811 is reproduced, the block 811 is reproduced successively toward the EOT so that the block 811 with the block number 2 is reproduced. The reproduction of blocks 811 is conducted until the finally recorded block 811 is reproduced.

The tape information 821 is recorded in the block number 1, which is the head block of the tape 136A. The tape information 821 may be recorded in a plurality of blocks with block numbers 1, 2, and the like. During full backup and also during the differential/incremental backup, the tape number 631, tape class 632, one block size 633, and tape capacity 634 are recorded as tape information 821, with reference to the Tape Media Management Table 603.

The tape group information 501 is recorded in the block number next to the block where the tape information 821 is recorded. The tape group information 501 may be recorded in a plurality of blocks. In the case of full backup, a device number 921, a tape group number 621, a backup source LUN 624, a backup data class 625, and recording date and time 628 are recorded as the tape group information 501, and in the case of differential/incremental backup, a backup source device number 921, a tape group number 621, a backup source LUN 624, a backup data class 625, recording date and time 628, and a data group number 626 necessary for restoration are recorded as the tape group information by referring to the Tape Group Management Table 602. The device number 921 is a number for uniquely identifying the storage subsystem 101 where the backup is conducted.

The data management information 511 is recorded in the block number next to the block where the tape group information 501 has been recorded. The data management information 511 may be recorded in a plurality of blocks. In the case of full backup, a LUN 931 and a LU capacity 932 are recorded as the data management information 511, and in the case of differential/incremental backup, the LUN 931, LU 932, differential management size 724, and differential bitmap 703 are recorded as the data management information with reference to the Data Differential Management Table 702. The LUN 931 is a LUN of the backup source LU. The LU capacity 932 is a LU capacity of the backup source LU. In the case of incremental backup, the differential bitmap 703 contained in the data management information 511 is for incremental backup. Thus, in the case of incremental backup, only the incremental bitmap is recorded on the tape (that is, for each single LU) and the differential bitmap may not be recorded. A bit that is the differential backup object is recorded in the differentia bitmap, and a bit that is an incremental backup object is recorded in the incremental bitmap so that whether to perform differential backup or to perform incremental backup can be determined by the indication from the host computer 100.

Data of the backup source LU are recorded from the block number next to the block where the data management information 511 is recorded. In the Processing of Full Backup, all the data of the backup source LU are recorded, and in the Processing of Incremental/Differential Backup, only differential data are recorded. Once recording of the backup source LU of the data management information 511*a* has ended, the recording of the backup source LU of the data management information 511*b* is performed in the block with the next block number. Recording of the data management information 511*b* may be performed in the block with the block number next to the data management information 511*a*, and the data of all the LU of the backup source LU may be recorded in the block with the lock number next to the data management information 511.

Once the recording of all the backup source LU has ended, the EOD 812 is recorded, and recording on the tape in the Processing of Backup is completed. When the backup data are recorded on the same tape 136A, the recording to the tape is performed from the block with the block number next to the EOD 812. Furthermore, in the case where the backup data are recorded on the tapes 136A and 136B, the tape information 821 is recorded on the head block of the tape 136B, and the continuation of information recorded in the final block of the tape 136A is recorded in the block with the next block number.

Figure 11:
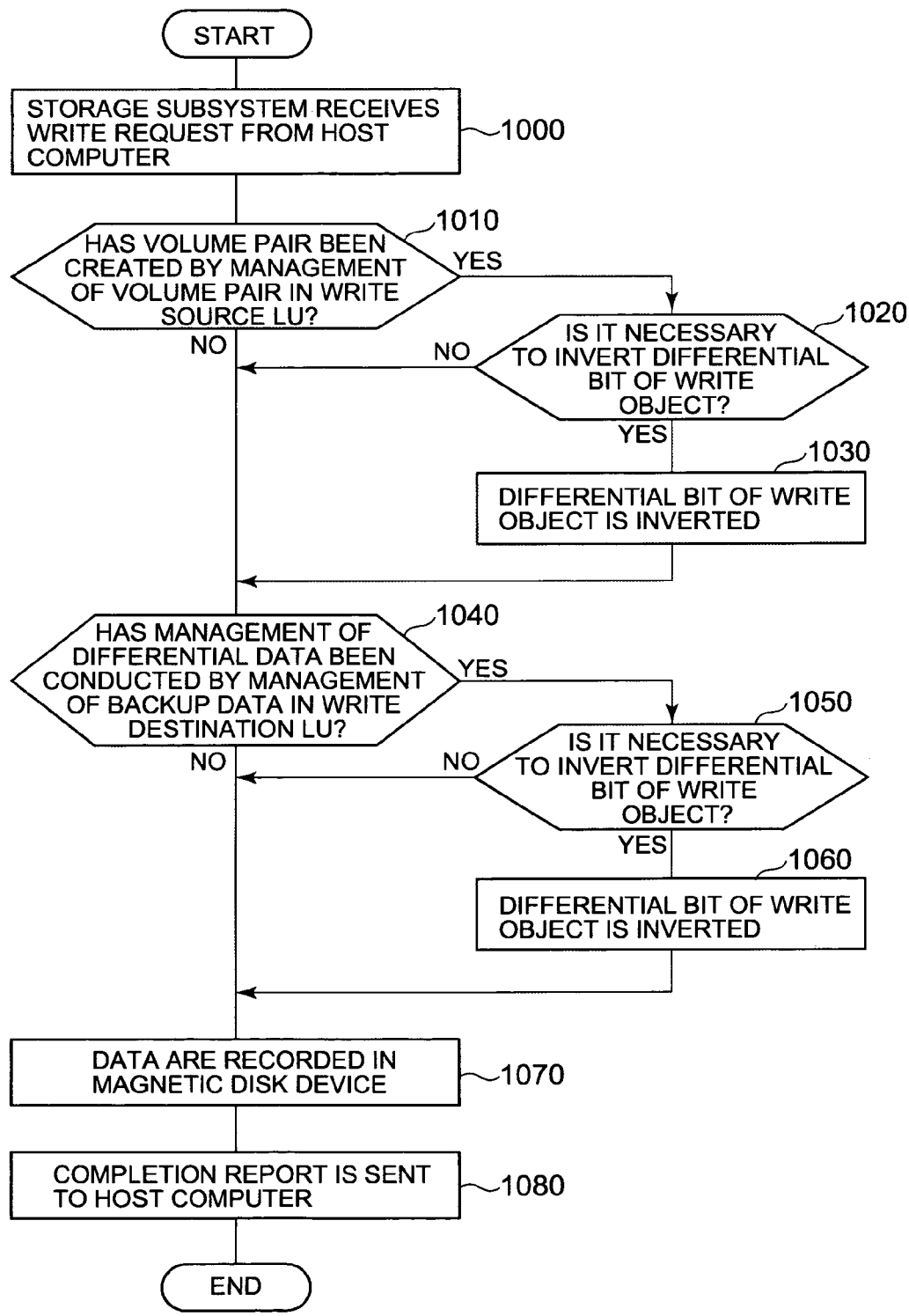
FIG. 11 shows a processing flow relating to the case where the storage subsystem 101 receives a write request from the host computer 100 to a disk 124.

FIG. 11 shows the processing flow executed when the storage subsystem 101 receives a write request to the disk 124 from the host computer 100.

In step 1000, the controller 123 receives the write request to the disk 124 from the host computer 100. As a result, the Disk Control Program 132 is executed. By the Disk Control Program 132, the write object data corresponding to the write request are temporarily stored in the cache memory 203.

In step 1010, the Disk Control Program 132 refers to the Volume Pair Management Table 301 and checks whether the LUN of the write estimation LU is a primary volume 312 or a secondary volume 313. If it is, the processing flow advances to step 1020, if it is not, the processing flow advances to step 1040.

In step 1020, the Disk Control Program 132 refers to the status 314 of the Volume Pair Management Table 301 and the Volume Pair Differential Management Bitmap 303 and checks whether the differential bit of the write object has to be inverted. When the differential bit has to be inverted (for example, in the case where it is determined that the write object data will be written in a location in which the differential bit is not inverted as the status is a pair split status), the processing flow advances to step 1030, and in the case where the incremental bit does not have to be inverted (for example, in the case of a pair status or when the status is a pair split status, but the differential bit has already been inverted), the processing flow advances to step 1040.

In step 1030, the Disk Control Program 132 inverts the differential bit that is the write object of the Volume Pair Differential Management Bitmap 303.

In step 1040, the Backup/Restore Control Program 131 refers to the Backup Data Differential Management Table 702 and checks whether the LUN of the write destination LU is LUN 721. If it is, the processing flow advances to step 1050, if it is not, the processing flow advances to step 1070.

In step 1050, the Backup/Restore Control Program 131 refers to the Backup Data Differential Management Bitmap 703 and checks whether the differential bit that is a write object has already been inverted. If there are differential bitmaps for both the differential backup and the incremental backup, both bitmaps are checked. When the bit has been inverted, the processing flow advances to step 1070, and when the bit has not been inverted, the processing flow advances to step 1060.

In step 1060, the Backup/Restore Control Program 131 inverts the differential bit of the write object of the Backup Data Differential Management Bitmap 703. If there are differential bitmaps for both the differential backup and the incremental backup, the differential bits of both bitmaps are inverted.

In step 1070, the Disk Control Program 132 writes the data that are temporarily stored in the cache memory 203 into the disk 124. In step 1080, the Disk Control Program 132 sends a completion report to the host computer 100.

Figure 12:
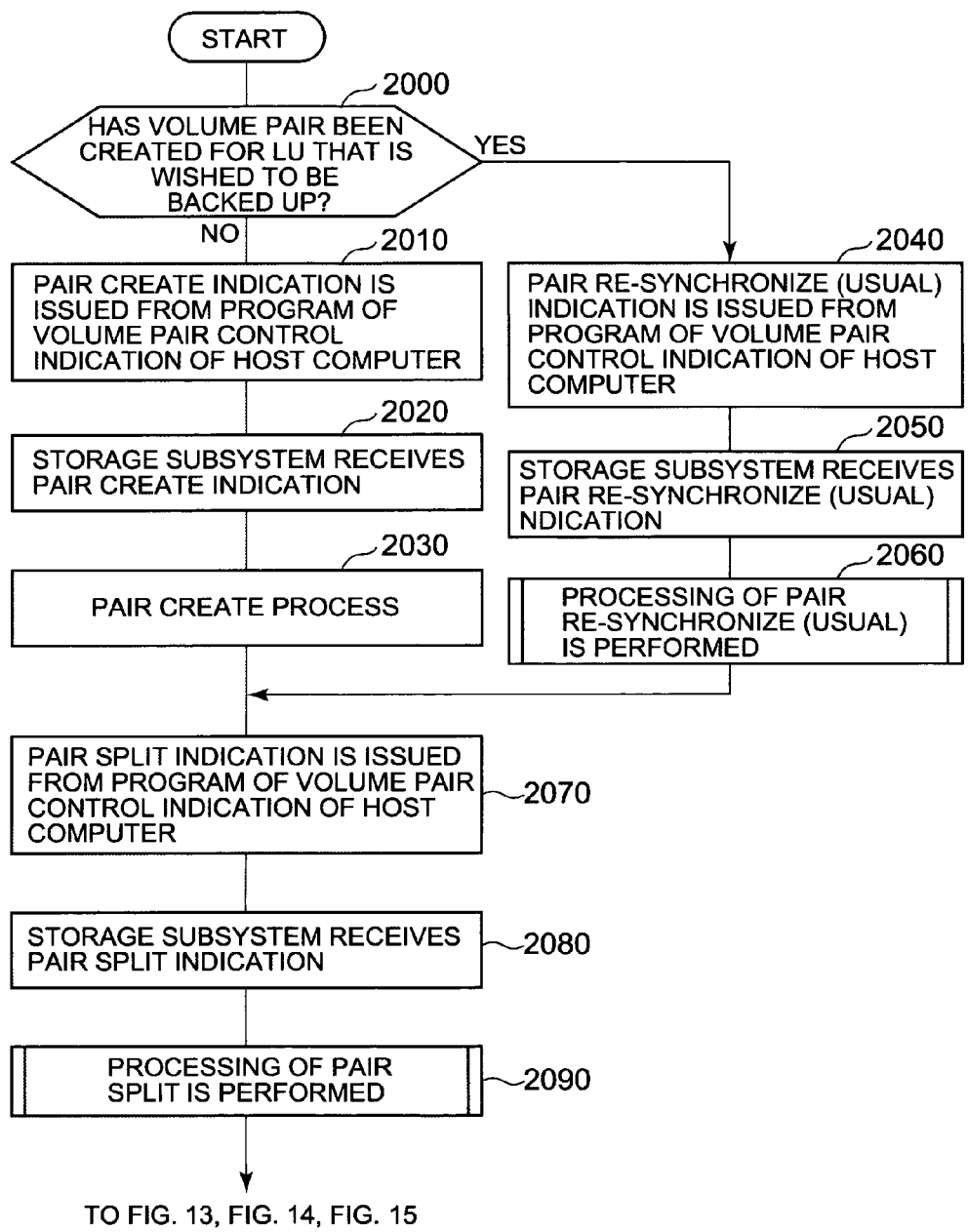
FIG. 12 shows a processing flow of Preprocessing of Backup.
Figure 13:
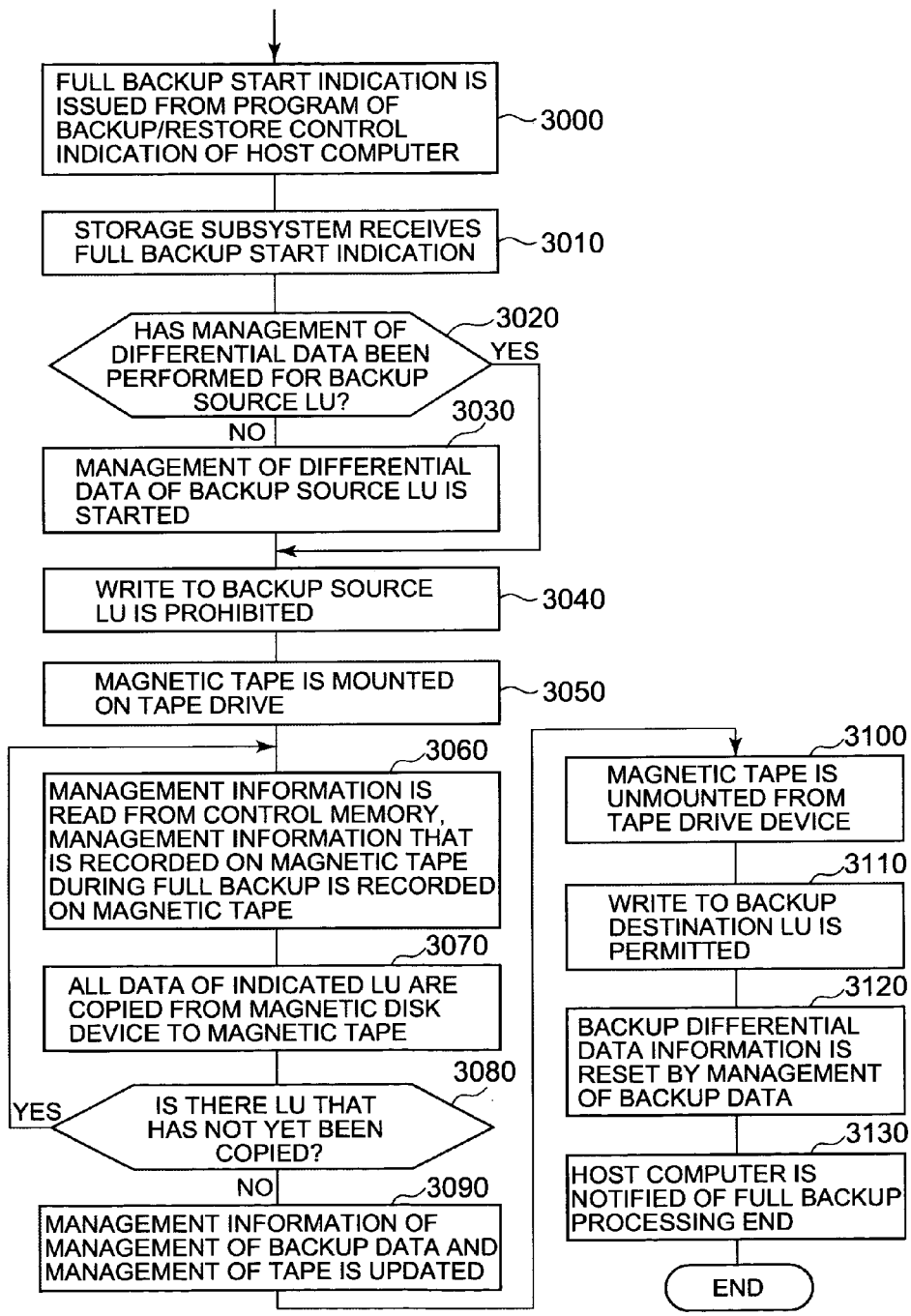
FIG. 13 shows a processing flow of Processing of Full Backup.
Figure 14:
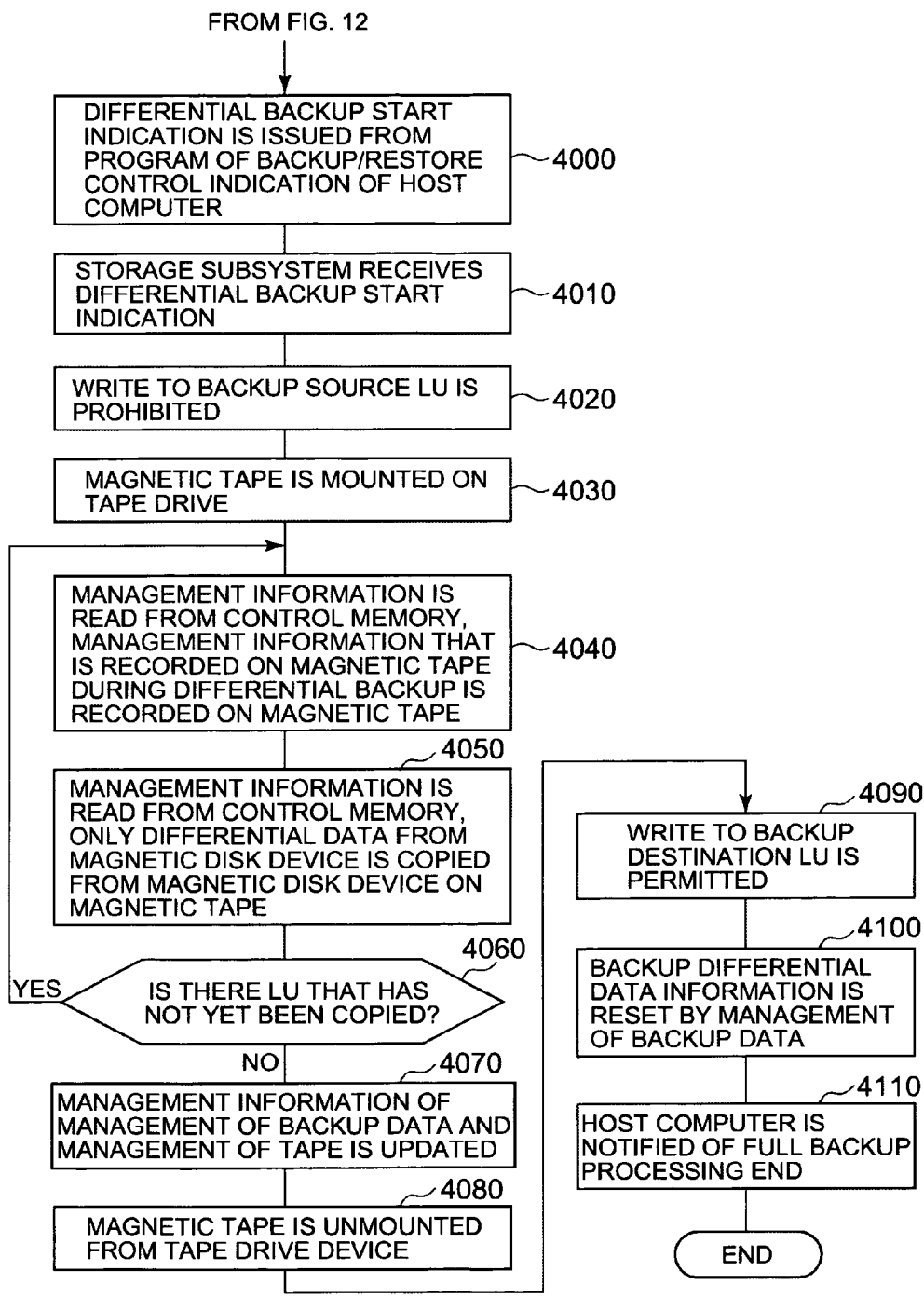
FIG. 14 shows a processing flow of Processing of Differential Backup.
Figure 15:
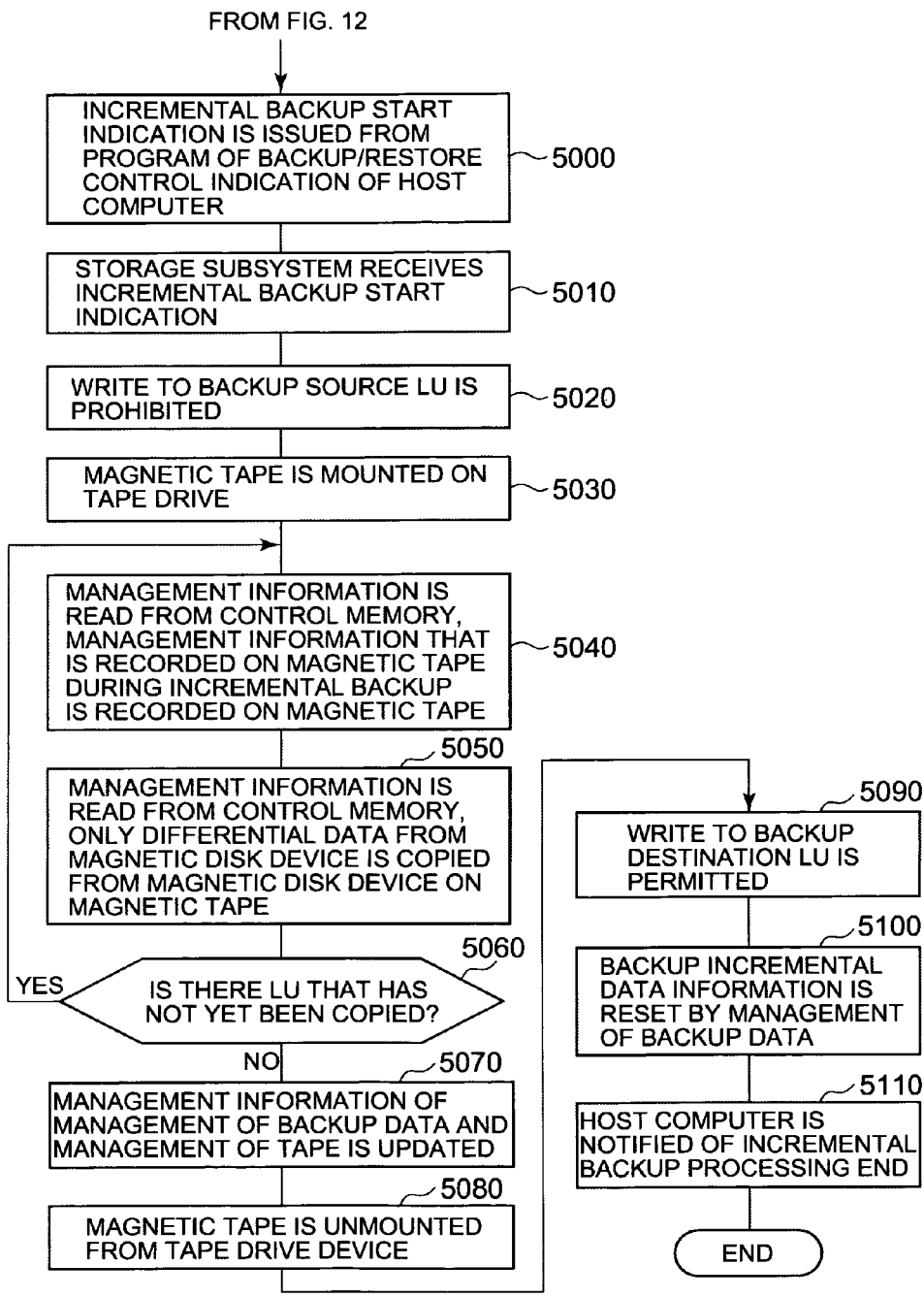
FIG. 15 shows a processing flow of Processing of Incremental Backup.

FIGS. 12 and 13 show the processing flow of Processing of Full Backup, FIGS. 12 and 14 show the processing flow of Processing of Differential Backup, and FIGS. 12 and 15 show the processing flow of Processing of Incremental Backup.

In step 2000, it is checked whether the LU that is wished to be backed up forms a volume pair. This may be checked by the user, or the Program 112 of Volume Pair Control Indication may check the Volume Pair Management Table 301. In the case where a pair has not been created, the processing flow advances to step 2010, and in the case where a pair has been created, the processing flow advances to step 2040.

In step 2010, a Pair Create Indication is issued from the Program 112 of Volume Pair Control Indication of the host computer 100 to the storage subsystem 101. In step 2020, the Disk Control Program 132 receives the Pair Control Indication. In step 2030, the Disk Control Program 132 updates the Volume Pair Management Table 301, Volume Pair Differential Management Table 302, and Volume Pair Differential Management Bitmap 303, copies the information of the primary volume 124*a* to the secondary volume 124*b*, and sets the status 314 of the Volume Pair Management Table 301 to a pair status once the copying is completed.

In step 2040, a Pair Re-synchronize (Usual) Indication is issued from the Program 112 of Volume Pair Control Indication of the host computer 100 to the storage subsystem 101. In step 2050, the Disk Control Program 132 receives the Pair Re-synchronize (Usual) Indication. In step 2060, the Processing of Pair Re-synchronize (Usual) is performed. This processing is explained below with reference to FIG. 19.

In step 2070, a Pair Split Indication is issued from the Program 112 of Volume Pair Control Indication of the host computer 100 to the storage subsystem 101. In step 2080, the Disk Control Program 132 receives the Pair Split Indication. In step 2090, the Processing of Pair Split is performed. This processing is explained below with reference to FIG. 20. In the Pair Split Indication, a pair number is indicated for which the aforementioned LU that is wished to be backed up (in other words, the backup source LU) becomes the secondary volume.

As shown in FIG. 13, in step 3000, a Full Backup Start Indication is issued from the Program 113 of Backup/Restore Control Indication of the host computer 100 to the storage subsystem 101. In this Full Backup Start Indication, the LUN of the secondary volume in a volume pair corresponding to the pair number indicated by the Pair Split Indication is indicated as the backup source LUN.

In step 3010, the Backup/Restore Control Program 131 receives the Full Backup Start Indication. At this timing, the Backup/Restore Control Program 131 may output a write prohibition request to the Disk Control Program 132. The same can be done in step 4000 and step 5000.

In step 3020, the Backup/Restore Control Program 131 checks whether a LUN of the backup source LU (for example, the backup source LUN indicated by the Full Backup Start Indication) is present in the LUN 721 of the Backup Data Differential Management Table 702. When it is not present, the processing flow advances to step 3030, and when it is present, the processing flow advances to step 3040.

In step 3030, the Backup/Restore Control Program 131 starts backup data differential management of the backup source LU. The size of the differential bitmap is computed from the LU capacity (volume capacity) of the backup source LU and the differential management size 724, and the differential bitmap storage position is reserved. The differential management size 724 may be determined in advance by the storage subsystem 101 or may be set by the user. The Backup/Restore Control Program 131 creates two differential bitmaps for differential backup and incremental backup and enters the storage positions thereof into the Backup Data Differential Management Table 702.

In step 3040, the Disk Control Program 132 inhibits writing to the backup source LU at the predetermined time (for example, when a write prohibition request is received from the Backup/Restore Control Program 131). More specifically, for example, the Disk Control Program 132 does not return the predetermined response (for example, write completion report) even if the write request is received. The same can be done in step 4020 and step 5020.

In step 3050, the Tape Library Control Program 133 controls the robot 134 and mounts the tape 136 serving as a backup destination on the tape driver 135. At this time, the necessary tapes 136 may be mounted on a plurality of tape drives 135 and parallel writing may be performed, and copy processing may be performed by replacing the tape 136 for which copying has ended with the tape 136 for which copying has not ended. For example, the tape 136 serving as a backup destination is an unused tape that is randomly selected by the Tape Library Control Program 133. The same can be done in step 4030 and step 5030.

In step 3060, the Backup/Restore Control Program 131 and Tape Library Control Program 133 operate together, whereby the management information 901 for recording on the tape during full backup is created and the created management information 901 is recorded on the tape 136. For example, the management information 901 can be created by processing such as referring to the control memory 201 and acquiring the information corresponding to the tape number 631 of the mounted tape 136 from the Tape Media Management Table 603. The tape group number 621 contained in the management information 901 is the number of the tape group for including at least one full backup data that will be recorded in the present Full Backup Start Indication. The LUN 931 and LU capacity 932 are the LUN and LU capacity of the backup source LU in this full backup. For example, in the case where the present tape group is started from the intermediate point of tape 136, but does not extend to the other tape 136, it is not necessary to create the tape information 821. This is because the tape information 821, as shown in FIG. 8, is information that will be recorded in the head section of the tape 136. This can be also done in step 4040 and step 5040.

In step 3070, the Backup/Restore Control Program 131, Disk Control Program 132, and Tape Library Control Program 133 operate together, whereby all the data of the LU indicated as the backup source are copied from the disk 124 to the tape 136. In this full backup, for example, 14 is recorded as the tape group number 621 in the Tape Group Management Table 602 shown in FIG. 6 by the Tape Management 218 and also "Backup is Performed" is recorded as the tape group status 622, "Full" is recorded as the backup data class 625, and "Normal" is recorded as a tape group status 622 when the backup is completed.

In step 3080, the Backup/Restore Control Program 131, Disk Control Program 132, and Tape Library Control Program 133 operate together, whereby step 3060 and step 3070 are repeated until copying of all the LU indicated as the backup source is completed. In step 3060 of this repetition, only the data management information 511 is created and recorded. The data management information 511 is to be included in each backup data. The same can be done in step 4040 based on repeating step 4060 and also in step 5040 based on repeating step 5060.

In step 3090, the management information of Management 211 of Backup Data and Tape Management 218 is updated. For example, the Management 211 of Backup Data adds information relating to the backup data subjected to full backup to the Backup Data Management Tale 701. Furthermore, the Tape Management 218 adds (or updates information in the case it has already been entered) relating to the tape group 411 to the Tape Group Management Table 602 and adds the number of the tape group for recording the present full backup data to the storage tape group number 613 of the tape pool management table 601. In the brackets above, for example, the case in which the tape group has been defined in advance prior to the backup is present as the case for information update (this is nor related to the difference between full/differential/incremental). In this case, for example, when 621,622,627 are entered prior to the backup and 622,623,624, 625,626,628 are entered (updated) after the backup, the information is sometimes updated in the Tape Group Management Table 602.

In step 3100, the Tape Library Control Program 133 controls the robot 134 and unmounts the tape 136 from the tape driver 135. At this time, the Tape Library Control Program 133 may output a write permission request to the Disk Control Program 132. The same can be done in step 4080 or step 5080.

In step 3110, the Disk Control Program 132 permits writing to the backup source LU at the prescribed moment (for example, when the write permission request is received from the Tape Library Control Program 133). The same can be done in step 4090 or step 5090.

In step 3120, the Backup/Restore Control Program 131 resets the Backup Data Differential Management Bitmap 703 of the backup source LU of the Management 211 of Backup Data for both the differential backup and for the incremental back (for example, all differential bitmaps are set to 0). In step 3130, the Backup/Restore Control Program 131 notifies the host computer 100 of the backup processing end.

As shown in FIG. 14, in step 4000, a Differential Backup Start Indication is issued from the Program 113 of Backup/Restore Control Indication of the host computer 100 to the storage subsystem 101. With this Differential Backup Start Indication, for example, the LUN of the secondary volume in the volume pair corresponding to the pair number indicated by the Pair Split Indication is indicated as a backup source LUN.

In step 4010, the Backup/Restore Control Program 131 receives the Differential Backup Processing Start Indication. In step 4020, the Disk Control Program 132 prohibits writing to the backup source LU. In step 4030, the Tape Library Control Program 133 mounts the tape 136 that is a backup destination on the tape drive 135. At this time, the necessary tapes 136 may be mounted on a plurality of tape drives 135 and parallel writing may be performed, and copy processing may be performed by replacing the tape 136 for which copying has ended with the tape 136 for which copying has not ended.

In step 4040, the Backup/Restore Control Program 131 and Tape Library Control Program 133 operate together, whereby management information 902 for recording on a tape during differential backup is created and this management information 902 is recorded on the tape 136. The tape group number 621 is a present tape group number for including at least one differential backup data that will be recorded by the present Differential Backup Start Indication. The management information 902 includes the tape group number 626 necessary for restoration, and this number 626 is acquired, for example, from a backup destination tape group number 713 for which the Backup Data Management Table 701 satisfies the following three conditions:

A LUN identical to the backup source LUN of the present differential backup is a backup source LUN 712.

The backup data class 715 is full.

The date and time that are the closest to the present date and time, from the backup acquisition date and time 716 satisfying (1) and (2).

Furthermore, the data management information 511 includes the Differential Management Bitmap 703 at the differential management size 724 corresponding to the LUN 721 of the backup source LUN or at the differential bitmap storage position 725 corresponding to this LUN 721. In the case of incremental backup for example, in the tape group number 626 necessary for restoration that has been entered in the tape group number (can be any of full/differential/incremental) that satisfies the conditions (1) and (3) above, a tape group number (for example, a plurality thereof is entered that has this tape group number (satisfies the conditions (1) and (3) above) added thereto.

In step 4050, the Backup/Restore Control Program 131, Disk Control Program 132, and Tape Library Control Program 133 operate together, whereby the data with inverted differential bit are copied from the disk 124 to the tape 136 with reference to the Differential Management Bitmap 703 located in the differential bitmap storage position 725 for which the LUN number 721 is a backup source LUN and the backup class 723 corresponds to differential. In the course of this differential backup, for example, the present tape group number is recorded as the tape group number 621 in the Tape Group Management Table 602 of FIG. 6 by Management 218 of Tape, the "Backup is conducted" is recorded as the tape group status 622, "Differential" is recorded as the backup data class 625, and when the backup ends, "Normal" is recorded as the tape group status 622.

In the step 4060, the Backup/Restore Control Program 131, Disk Control Program 132, and Tape Library Control Program 133 operate together, whereby step 4040 and step 4050 are repeated until copying of all the LU indicated as the backup sources is completed.

In step 4070, the management information of the Management 211 of Backup Data and Management 218 of Tape is updated. For example, the Management 211 of Backup Data adds information relating to differential backup data to the Backup Data Management Table 701. The Management 218 of Tape adds information relating to a new tape group 411 where the differential backup data are recorded to the Tape Group Management Table 602 (or updates information when the information has already been entered) and adds the number of the new tape group 411 to the storage tape group number 613 of the Tape Pool Management Table 601.

In step 4080, the Tape Library Control Program 133 controls the robot 134 and unmounts the tape 136 from the tape drive 135. In step 4090, the Disk Control Program 132 permits writing to the backup source LU. In step 4100, the Backup/Restore Control Program 131 resets the Backup Data Differential Management Bitmap 703 of the backup source LU for the incremental backup (for example, all the differential bitmaps are set to 0). In step 4110, the Backup/Restore Control Program 131 notifies the host computer 100 of the differential backup processing end.

As shown in FIG. 15, in step 5000, an Incremental Backup Start Indication is issued from the Program 113 of Backup/Restore Control Indication of the host computer 100 to the storage subsystem 101.

In step 5010, the Backup/Restore Control Program 131 receives the Incremental Backup Start Indication. In step 5020, the Disk Control Program 132 prohibits writing to the backup source LU. In Step 5030, the Tape Library Control Program 133 mounts the tape 136 serving as a backup destination on the tape driver 135. At this time, the necessary tapes 136 may be mounted on a plurality of tape drives 135, writing may be performed in parallel, and copy processing may be performed by replacing the tape 136 for which copying has ended with the tape 136 for which copying has not ended.

In step 5040, the Backup/Restore Control Program 131 and Tape Library Control Program 133 operate together, whereby management information 902 for recording on a tape during incremental backup is created, and this management information 902 is recorded on the tape 136. The tape group number 621 is a present tape group number for including at least one incremental backup data that will be recorded by the present Incremental Backup Start Indication.

In step 5050, the Backup/Restore Control Program 131, Disk Control Program 132, and Tape Library Control Program 133 operate together, whereby the data with inverted differential bit are copied from the disk 124 to the tape 136 with reference to the Differential Management Bitmap 703 located in the differential bitmap storage position 725 for which the LUN 721 is a backup source LUN and the backup class 723 corresponds to incremental. In the course of this incremental backup, for example, the present tape group number is recorded as the tape group number 621 in the Tape Group Management Table 602 of FIG. 6 by Management 218 of Tape, the "Backup is conducted" is recorded as the tape group status 622, "Incremental" is recorded as the backup data class 625, and when the backup ends, "Normal" is recorded as the tape group status 622.

In the step 5060, the Backup/Restore Control Program 131, Disk Control Program 132, and Tape Library Control Program 133 operate together, whereby step 5040 and step 5050 are repeated until copying of all the LU indicated as the backup sources is completed.

In step 5070, the management information of the Management 211 of Backup Data and Management 218 of Tape is updated. For example, the Management 211 of Backup Data adds information relating to incremental backup data to the Backup Data Management Table 701. The Management 218 of Tape adds information relating to a new tape group 411 where the incremental backup data are recorded to the Tape Group Management Table 602 (or updates information when the information has already been entered) and adds the number of the new tape group 411 to the storage tape group number 613 of the Tape Pool Management Table 601.

In step 5080, the Tape Library Control Program 133 controls the robot 134 and unmounts the tape 136 from the tape drive 135. In step 5090, the Disk Control Program 132 permits writing to the backup source LU. In step 5100, the Backup/Restore Control Program 131 resets the Backup Data Differential Management Bitmap 703 of the backup source LU of the Management 211 of Backup Data for the incremental backup (for example, all the differential bitmaps are set to 0). In step 5110, the Backup/Restore Control Program 131 notifies the host computer 100 of the incremental backup processing end.

Figure 16:
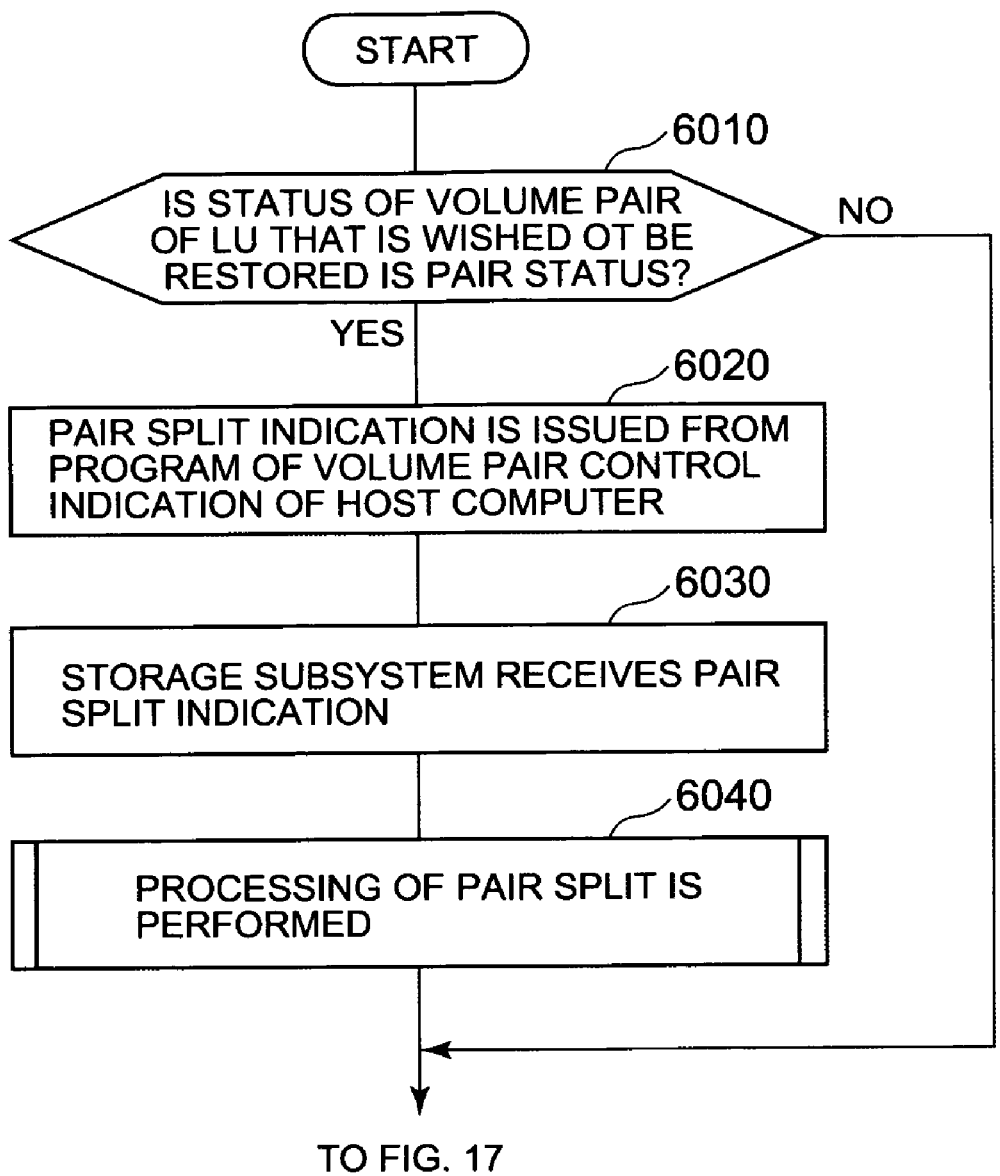
FIG. 16 shows a processing flow of Processing of Restore.
Figure 17:
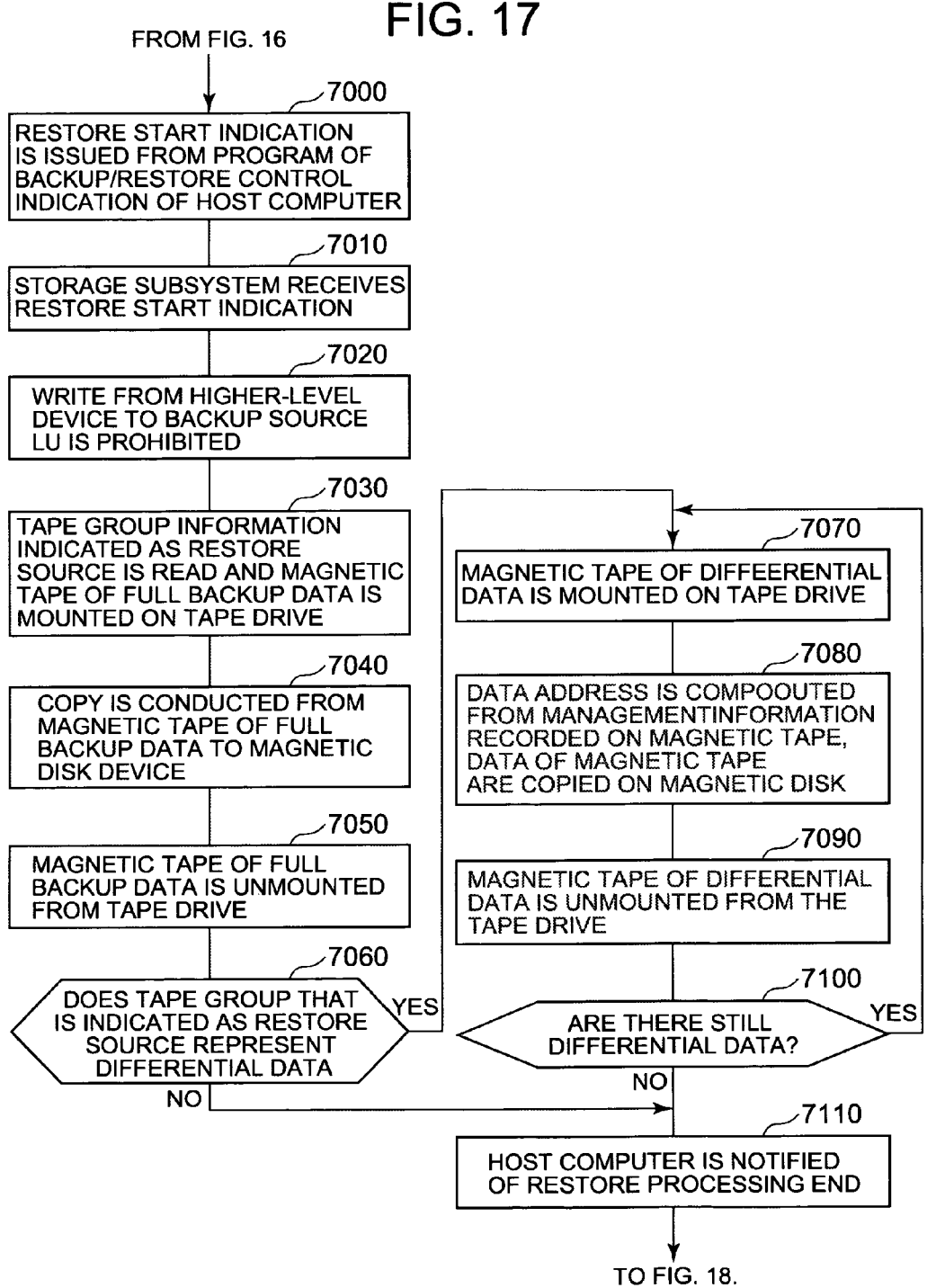
FIG. 17 shows a processing flow of Processing of Restore following the processing shown in FIG. 16.
Figure 18:
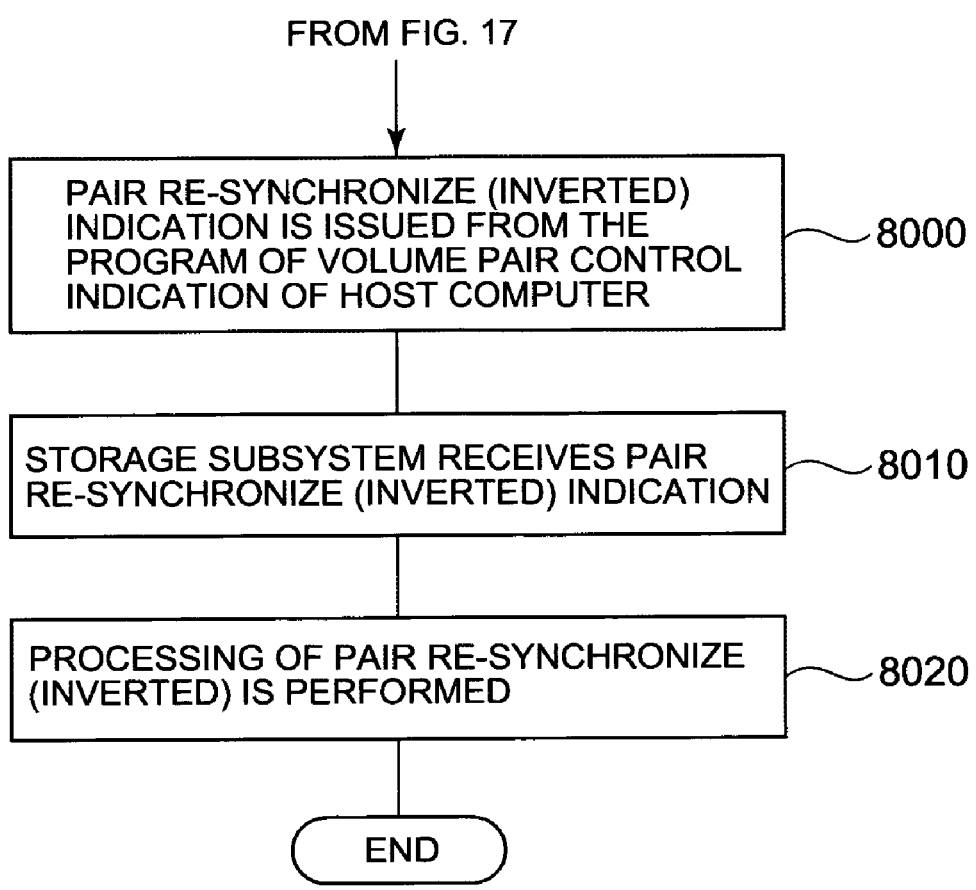
FIG. 18 shows a processing flow of Processing of Restore following the processing shown in FIG. 17.

FIGS. 16, 17, and 18 show the processing flow of restore processing.

As shown in FIG. 16, in step 6010, the user or Program 112 of Volume Pair Control Indication refers to the Volume Pair Management Table 301 of the Management 215 of Volume Pair and checks whether the status 3145 of the LU that is wished to be restored (restore destination LU, for example, LU called on by the user) is a pair status. If it is a pair status, the processing flow advances to step 6020, and if it is not the pair status, the processing flow advances to step 7000.

In Step 6020, a Pair Split Indication is issued from the Program 112 of Volume Pair Control Indication of the host computer 100 to the storage subsystem 101. In step 6030, the Disk Control Program 132 receives the Pair Split Indication. In step 6040, the pair split processing is performed. Details thereof are described below in FIG. 20.

As shown in FIG. 17, in step 7000, a Restore Start Indication is issued from the Program 113 of Backup/Restore Control Indication of the host computer 100 to the storage subsystem 101

In step 7010, the Backup/Restore Control Program 131 receives the Restore Start Indication. At this time, the Backup/Restore Control Program 131 may issue a write prohibition request to the Disk Control Program 132.

In step 7020, the Disk Control Program 132 prohibits writing from the host computer 100 to the restore destination LU at the prescribed time (for example, when the write prohibition request is received by the Backup/Restore Control Program 131).

In step 7030, the Backup/Restore Control Program 131 and the Tape Library Control Program 133 operate together, whereby a tape group number 626 necessary for restoration the Tape Group Management Table 602 of the tape group 411 indicated as a restore source is referred to and the tape 136 where the full-backup data have been recorded is mounted on the tape drive 135. For example, if nothing is recorded in the tape group number 626 necessary for restoring, then the tape group 411 indicated as the restore source is full backup data, and if 11, 12 is recorded in the tape group number 626 necessary for restoring, then the tape group 411 of the tape group number 11 which is a leading number is the full backup data. Furthermore, for example, when the Backup/Restore Control Program 131 receives the indication of backup acquisition date and time of the backup data that are whished to be restored, then the tape group 411 of the backup destination tape group number 713 corresponding to this backup acquisition date and time is the aforementioned "tape group 411 indicated as the restore source".

In step 7040, the Backup/Restore Control Program 131, 132 and Tape Library Control Program 133 operate together, whereby data 512 present in the full backup data are copied from the tape 136 where the full backup data have been recorded into the disk 124 of the LU indicated as the restore destination. If the restore destination LU is not specifically indicated, then it may be automatically considered as the LU that is the backup source.

In step 7050, the Tape Library Control Program 133 unmounts the tape 136 where the full backup data have been recorded from the tape driver 135.

In step 7060, the Backup/Restore Control Program 131 refers to the backup data class 625 corresponding to the date group 411 indicated as a restore source and checks whether the data is full backup data. In the case of full backup data, the processing flow advances to step 7110, and in the case of differential backup data or incremental backup data, the processing flow advances to step 7070.

In step 7070, the Backup/Restore Control Program 131 and Tape Library Control Program 133 operate together, whereby the tape group number 626 necessary for the restoration corresponding to the tape group 411 indicated as a restore source is referred to and then the tape 136 having recorded thereon the differential/incremental backup data (differential backup data or incremental backup data) that have to be copied is mounted on the tape drive 135. For example, if 21, 22 and 23 are recorded in the tape group number 626 necessary for restoration, when copying of the tape group 411 with a tape group number of 21 is completed, copying of the tape group 411 with the tape group number of 22 is then conducted, and when the copying of the tape group 411 with the tape group number 22 is completed, copying of the tape group 411 with the tape group number 23 is then conducted.

In step 7080, the Backup/Restore Control Program 131, Dick Control Program 132, and Tape Library Control Program 133 operate together, whereby the management information 902 located in the tape 136 where the differential/incremental backup data have been recorded is referred to, and the data 512 of the tape 136 are copied into the disk 124 with the LU indicated as a restore destination, while computing the LBA of the restore destination LU into which data 512 have to be copied. For example, the LBA of the restore destination LU into which data 512 have to be copied is computed by using the differential bitmap 703 and differential management size 724 recorded on the tape 136. More specifically, for example, when the head section LBA of the restore destination LU is 100, the block size is 1 MP, the differential management size 724 is 1 MB, and the differential bitmap 703 is taken as 011001 from the head section, the computation is conducted as follows: the LBA of the restore destination LU where the leading data 512 recorded on the tape 136 have to be copied is 101, the LBA of the restore destination LU where the second data 512 have to be copied is 102, the LBA of the restore destination LU where the third data 512 have to be copied is 105 . . . .

In step 7090, the Tape Library Control Program 133 unmounts from the tape drive 135 the tape 136 having recorded thereon the differential/incremental backup data for which the copying processing has ended.

In step 7100, steps 7070, 7080, 7090 are repeated until all the tape group numbers 621 recorded in the tape group number 626 necessary for the restoration are copied. In step 7110, the Backup/Restore Control Program 131 notifies the host computer 100 of the restore processing end.

As shown in FIG. 18, in step 8000, a Pair Re-synchronizing (Inversion) Indication is issued from the Program 112 of Volume Pair Control Indication of the host computer 100 to the storage subsystem 101. In step 8010, the Disk Control Program 132 receives the Pair Re-synchronizing (Inversion) Indication. In step 8020, the Disk Control Program 132 performs the Processing of Pair Re-synchronizing (Inversion). For example, data are copied from the secondary volume 124b where the backup data recorded on the tape 136 are copied into the primary volume 124a and the data are matched.

Thus, the "Pair Re-synchronizing (Inversion) Indication" is an indication to set the volume pair with a pair split status into a status of transition to a pair status and perform copying in the inverted direction, while the volume pair is in this status. More specifically, this is an indication to match the contents of the secondary volume with the contents of the primary volume by copying the data located in the secondary volume (all the data, or the data representing the difference with the primary volume) into the primary volume. By contrast, the "Pair Re-synchronizing (Usual) Indication" is an indication to set the volume pair with a pair split status into a status of transition to a pair status and perform copying in the usual direction, while the volume pair is in this status. More specifically, this is an indication to match the contents of the primary volume with the contents of the secondary volume by copying the data located in the primary volume (all the data, or the data representing the difference with the primary volume) into the secondary volume.

FIG. 19 shows a processing flow of the Processing of Pair Re-synchronizing (Usual).

In step 9000, the Management 215 of Volume Pair sets the status 314 of the Volume Pair Management Table 301 to a status of transition to a pair status.

In step 9010, the Disk Control Program 132 refers to the Volume Pair Differential Management Bitmap 303 of the Management 215 of Volume Pair and copies the differential data from the primary volume 124a to the secondary volume 124b.

In step 9020, the Management 211 of Backup Data refers to the LUN 721 of the Backup Data Differential Management Table 702 and checks the presence of a LUN of the secondary volume 124b. When it is not present, the processing flow advances to step 9050, and when it is present the processing flow advances to step 9030.

In step 9030, the Management 211 of Backup Data refers to the Backup Data Differential Management Bitmap 703 and checks whether the differential bit that is the object of copying has already been inverted. The differential bitmaps for both the differential backup and the incremental backup are checked. In the case where the differential bit has been inverted, the processing flow advances to step 9050, and in the case where the differential bit has not been inverted, the processing flow advances to step 9040.

In step 9040 the Management 211 of Backup Data inverts the differential bit that is the copy object of the Backup Data Differential Management Bitmap 703. The differential bits of the differential bitmaps for both the differential backup and the incremental backup are inverted.

In step 9050, steps 9010, 9020, 9030, 9040 are repeated until the data of the primary volume 124a and secondary volume 124b are matched.

In step 9060, the Management 215 of Volume Pair sets the status 314 of the Volume Pair Management Table 301 to a pair status.

FIG. 20 shows the processing flow of Processing of Pair Split.

In step 9100, the Management 215 of Volume Pair sets the status 314 of the Volume Pair Management Table 301 to a status of transition to a pair split status.

In step 9110, the Disk Control Program 132 refers to the Volume Pair Differential Management Bitmap 303 of the Management 215 of Volume Pair and, if the inverted bit is present, copies the differential data corresponding to this bit from the primary volume 124a to the secondary volume 124b. The case where an asynchronous copying is conducted between the primary volume 124a and secondary volume 124b is an example of the case where an inverted bit is present at this time.

In step 9120, the Management 211 of Backup Data refers to the LUN 721 of the Backup Data Differential Management Table 702 and checks whether a LUN of the secondary volume 124b is present. When it is not present, the processing flow advances to step 9150, and when it is present the processing flow advances to step 9130.

In step 9130, the Management 211 of Backup Data refers to the Backup Data Differential Management Bitmap 703 and checks whether the differential bit that is the object of copying has already been inverted. The differential bitmaps for both the differential backup and the incremental backup are checked. In the case where the differential bit has been inverted, the processing flow advances to step 9150, and in the case where the differential bit has not been inverted, the processing flow advances to step 9140.

In step 9140, the Management 211 of Backup Data inverts the differential bit that is the copy object of the Backup Data Differential Management Bitmap 703. The differential bits of the differential bitmaps for both the differential backup and the incremental backup are inverted.

In step 9150, steps 9110, 9120, 9130, 9140 are repeated until the data of the secondary volume 124b match the data of the primary volume 124a at the point in time the Pair Split Indication is received.

In step 9160, the Management 215 of Volume Pair sets the status 314 of the Volume Pair Management Table 301 to a split status.

With the above-described first embodiment, in the case of differential/incremental backup of user's data, the management information 902 is recorded in addition to the user's data on the tape 136. As a result, when restoration is preformed, the restoration can be conducted by using the management information 902 recorded on the tape 136, even when information of the control memory 201 of the storage subsystem 101 where the backup is conducted is absent.

Furthermore, with the above-described first embodiment, the Backup Data Differential Management Bitmap 703 is recorded on the tape 136 each time the differential/incremental backup is performed. Further, when the differential backup is performed, the Differential Management Bitmaps 703 for both the differential backup and the incremental backup are reset, and when the incremental backup is performed, the Differential Management Bitmap 703 for the incremental backup is reset. In other words, the differential bitmaps that have to be held in the storage subsystem for one or many backup source LU are two bitmaps for the differential backup and incremental backup, regardless of the number of generations that have to be differentially managed. As a result, it is possible to avoid limiting the number of generations that can be differentially managed to the storage capacity of the storage subsystem memory.

Embodiment 2

For example, the primary volume 124a may be allocated in the first storage subsystem, the secondary volume 124b may be allocated in the second storage subsystem, and remote copying may be performed between the first and second storage subsystems. In this case, the tape library device 125 is provided in the second storage subsystem.

Several preferred embodiments of the present invention are described above, but they merely serve to illustrate the present invention, and the scope of the present invention is not limited to those embodiments. The present invention can be also implemented in a variety of other forms.

What is claimed is:

1. A storage system comprising a plurality of storage devices of a sequential access type, the storage devices operable to process a sequential access at a high speed, but unable to process a random access at a high speed, and at least one storage device of a random access type operable to process a random access faster than said storage devices of a sequential access type, and in which data located in a logical volume on said at least one storage device of a random access type are backed up in said storage devices of a sequential access type, said storage system comprising:
- a full backup section operable to execute a full backup causing all data located in said logical volume to be backed up from said logical volume to a sequential device group comprising said plurality of storage devices of a sequential access type;
- a differential management information storage section operable to store differential management information, the differential management information being information representing a difference between said logical volume and said sequential device group after said full backup;
- a differential management section operable to updates said differential management information in response to an update of said logical volume; and
- a partial backup section operable to execute a partial backup by which partial data that are data equivalent to a difference between said logical volume and said sequential device group are specified by using said updated differential management information, information necessary for restoration that is necessary to restore a data group located in said updated logical volume by using said partial data is recorded in said sequential device group, and said partial data are backed up from said updated logical volume to said sequential device group, and further comprising:
- a backup management storage section operable to store backup unit management information representing, as a backup unit, a storage area of said sequential device group, that has been consumed by a backup to said sequential device group, and
- a backup unit management section operable to add, to said backup unit management information, information representing, as one backup unit, the storage area that has been consumed by said backup when said full backup or said partial backup is completed, wherein said backup unit management section comprises, for each backup unit, a backup unit identifier, a backup class representing a class of backup, and a sequence information representing a sequence of backup in said backup unit management information, and said partial backup section is operable to specify a backup unit having recorded therein backup of data necessary for restoration of said partial backup based on the sequence information and backup class in said backup unit management information and comprises a backup unit identifier of said specified backup unit and a backup class indicating that this is a partial backup in said information necessary for restoration.

2. The storage system according to claim 1, wherein:
said partial backup section includes said updated differential management information in said information necessary for restoration, and
said differential management section resets said updated differential management information in the case where said partial backup is conducted, and updates said reset differential management information in the case where said logical volume is thereafter updated.

3. The storage system according to claim 1, wherein:
said differential management information is a bit map, each bit of said bit map corresponds to each volume portion of said logical volume, and said partial backup section includes a storage size of said volume portion corresponding to the bit of said bit map and a storage capacity of said logical volume in said information necessary for restoration.

4. The storage system according to claim 1, wherein:
said at least one storage device of a random access type comprises a plurality of logical volumes,
said partial backup section is operable to performs said partial backup with respect to each of said plurality of logical volumes, and
said backup unit management section is operable to take a storage area comprising each data that is recorded by each said partial backup as said backup unit.

5. The storage system according to claim 1, wherein:
said partial backup section is operable to record said information necessary for restoration on the upstream side of said sequential device group from said partial data.

6. The storage system according to claim 1, wherein:
said partial backup section is operable to record said information necessary for restoration and said partial data on the downstream side from said all data that are recorded by said full backup.

7. The storage system according to claim 1, further comprising:
a restore section operable to restore said updated logical volume by using said information necessary for restoration that is recorded in said sequential device group.

8. The storage system according to claim 7, wherein:
said differential management information is a bit map,
each bit of said bit map corresponds to each volume portion of said logical volume,
said partial backup section comprises a storage size of said volume portion corresponding to the bit of said bit map and a storage capacity of said logical volume in said information necessary for restoration, and
said restore section is operable to restore said updated logical volume based on said storage size and said storage capacity contained in said information necessary for restoration.

9. The storage system according to claim 1, wherein:
said logical volume is a secondary logical volume from a volume pair comprising a primary logical volume, which is a copy source, and said secondary logical volume, which is a copy address.

10. The storage system according to claim 1, wherein:
said partial backup is any one of a differential backup and an incremental backup.

11. The storage system according to claim 1, wherein:
said differential management information is a bit map,
each bit of said bit map corresponds to each volume portion of said logical volume,
said partial backup section comprises, in said information necessary for restoration, said updated bit map, a storage size of said volume portion corresponding to the bit of said bit map, and a storage capacity of said logical volume, records said information necessary for restoration and said partial data on the downstream side from said all data that are recorded by said full backup, and at this time records said information necessary for restoration on the upstream side of said sequential device group from said partial data,
said differential management section is operable to reset said updated bit map in the case where said partial backup is conducted and updates said reset bit map in the case where said logical volume is thereafter updated, and said partial backup is any one of a differential backup and an incremental backup.

12. The storage system according to claim 11, wherein:
said bit map comprises a bit map for a differential backup and a bit map for an incremental backup, and
said bit map for incremental backup is included into said information necessary for restoration in the case of said incremental backup.

13. A backup method for performing backup of data located in a logical volume on at least one storage device of a random access type to a storage device of a sequential access type in a storage system having a plurality of said storage devices of a sequential access type that are storage devices of a type that can process a sequential access at a high speed, but cannot process a random access at a high speed, and said at least one storage device of a random access type that is a storage device of a type that can process a random access faster than said storage devices of a sequential access type, said method comprising:
executing a full backup by which all data located in said logical volume are backed up from said logical volume to a sequential device group comprising said plurality of storage devices of a sequential access type;
updating differential management information representing a difference between said logical volume and said sequential device group after said full backup in response to an update of said logical volume; and
executing a partial backup by which partial data that are data equivalent to a difference between said logical volume and said sequential device group are specified by using said updated differential management information, information necessary for restoration that is necessary to restore a data group located in said updated logical volume by using said partial data is recorded in said sequential device group, and said partial data are backed up from said updated logical volume to said sequential device group
a backup management storage section operable to store backup unit management information representing, as a backup unit, a storage area of said sequential device group, that has been consumed by a backup to said sequential device group, and
a backup unit management section operable to add, to said backup unit management information, information representing, as one backup unit, the storage area that has been consumed by said backup when said full backup or said partial backup is completed,
wherein said backup unit management section comprises, for each backup unit, a backup unit identifier, a backup class representing a class of backup, and a sequence information representing a sequence of backup in said backup unit management information, and said partial backup section is operable to specify a backup unit having recorded therein backup of data necessary for restoration of said partial backup based on the sequence information and backup class in said backup unit management information and comprises a backup unit identifier of said specified backup unit and a backup class indicating that this is a partial backup in said information necessary for restoration.

14. The backup method according to claim 13, wherein:
said updated differential management information is included in said information necessary for restoration, and
said updated differential management information is reset in the case where said partial backup is conducted, and said reset differential management information is updated in the case where said logical volume is thereafter updated.

15. The backup method according to claim 13, wherein:
said differential management information is a bit map,
each bit of said bit map corresponds to each volume portion of said logical volume, and
a storage size of said volume portion corresponding to the bit of said bit map and a storage capacity of said logical volume are included in said information necessary for restoration.

16. The backup method according to claim 13, wherein:
said updated logical volume is restored by using said information necessary for restoration that is recorded in said sequential device group.

17. The backup method according to claim 13, wherein:
said differential management information is a bit map,
each bit of said bit map corresponds to each volume portion of said logical volume,
said updated bit map, a storage size of said volume portion corresponding to the bit of said bit map, and a storage capacity of said logical volume are included in said information necessary for restoration,
in said partial backup, said information necessary for restoration and said partial data are recorded on the downstream side from said all data that are recorded by said full backup, and at this time said information necessary for restoration is recorded on the upstream side of said sequential device group from said partial data,
said updated bit map is reset in the case where said partial backup is conducted and said reset bit map is updated in the case where said logical volume is thereafter updated, and
said partial backup is any one of a differential backup and an incremental backup.

* * * * *